United States Patent [19]

Naruse et al.

[11] Patent Number: 4,985,919
[45] Date of Patent: Jan. 15, 1991

[54] SECURE COMMUNICATION CONTROL SYSTEM

[75] Inventors: Yoshihiro Naruse; Hideharu Kato, both of Chiba; Yoshifumi Iwata, Aichi, all of Japan

[73] Assignee: Aisin Seiki Kabushiki Kaisha, Kariya, Japan

[21] Appl. No.: 413,556

[22] Filed: Sep. 27, 1989

[30] Foreign Application Priority Data

Sep. 30, 1988 [JP] Japan ................................. 63-246055

[51] Int. Cl.⁵ .................... H04N 7/167; H04M 11/00
[52] U.S. Cl. ...................................... 380/18; 379/100; 379/344; 380/9; 380/41; 380/48
[58] Field of Search .................... 380/9, 18, 48, 41; 379/100, 344, 347

[56] References Cited

U.S. PATENT DOCUMENTS 3,507,980 4/1970 Rugaber et al. .
4,091,423 5/1978 Branscome .
4,759,053 7/1988 Satomi et al. ....................... 379/100
4,815,128 3/1989 Malek ...................................... 380/9
4,866,772 9/1989 Schruter ................................ 380/25
4,891,633 1/1990 Imazeki ................................. 380/18

Primary Examiner—Stephen C. Buczinski
Attorney, Agent, or Firm—Sughrue, Mion, Zinn, Macpeak & Seas

[57] ABSTRACT

Encoder/decoders are associated with conventional local and far-end communications equipment such as facsimile machines. Information to be faxed is encoded at one end, transmitted to the other end, and decoded, without affecting normal communications protocol or requiring other specialized equipment at either end. A secure information processing device is provided at each end, between the equipment and the communications line, and either encodes outgoing information or decodes incoming information, in accordance with a randomly generated key code, depending on whether the equipment at a particular end is transmitting or receiving a communication.

5 Claims, 29 Drawing Sheets

SECURE COMMUNICATION CONTROL SYSTEM

BACKGROUND OF THE INVENTION

The present invention relates to an add-on type secure communication control system that can be adapted readily, without any modification, to most conventional communication devices, such as facsimiles, used for transmission of images over a public switched network.

A great number of information/data encoding and decoding systems, have been proposed. One example of a facsimile with a security function is disclosed in Japanese Patent Unexamined Publication No. 1984-221167. This facsimile is designed to have a built-in security function or to be connected to an external security function via a specific interface. It also uses a non-standard function (NSF) signal specified as an optional function of CCITT's recommended communication protocol for automatic identification of the security function, and adds security function-related information to the NSF signal.

According to the invention in the above-mentioned Japanese publication, secure communication is limited to a small population of identical data circuit terminating equipment; that is, a station can choose only an identical station with which to communicate.

The facsimile based on the invention in the above-mentioned Japanese publication is designed to have a built-in security function or to use a security function as an external device. As a result, a conventional facsimile cannot use the security function according to the above-mentioned Japanese publication without modification or design change. In contrast, according to the present invention, any conventional communication device can be used directly for security communication without referencing any specific optional signal (e.g., NSF signal).

SUMMARY OF THE INVENTION

To achieve the foregoing and other objects, the security communication control system according to the present invention enables secure communication between a first, closer end of a communications line and a second, opposite end of the line, and includes:

a first plurality of signal wires for connection with the communication equipment on the opposite end of the line;

a first modem for modulating a signal to be transmitted to said first plurality of signal wires and for demodulating a signal to be received from said first plurality of signal wires;

a second plurality of signal wires for connection with the communication equipment on the closer end of the line;

a third plurality of signal wires;

a second modem connected to said third plurality of signal wires and used for modulating a signal to be transmitted to said third plurality of signal wires and for demodulating a signal to be received from said third plurality of signal wires;

security information processing means for supplying the demodulated signal of said first modem to the modulator input terminal of said second modem after decoding and for supplying the demodulated signal of said second modem to the modulator input terminal of said first modem after encoding;

switching means for connecting said second plurality of signal wires selectively to ones of said first and third pluralities of signal wires; and electronic control means for interrupting communication between terminal equipment at the closer end of the line and terminal equipment at the opposite end of the line by controlling said switching means, said first modem and said second modem in order to guide an encoded receive signal on the first plurality of signal wires to said security information processing means which decodes said receive signal and supplies to said second plurality of signal wires and to guide a transmit signal from said second plurality of signal wires to said security information processing means which encodes said transmit signal and supplies it to said first plurality of signal wires.

The security communication control system according to the present invention is capable of intervening between two pieces of communication terminal equipment by controlling said switching means. In addition, the signal modulated or demodulated by either the first or the second modem is encoded or decoded by the security information processing means and is transmitted to or received from the line. Thus, the security communication control system according to the present invention can add a secure communication function to a conventional communication device such as a facsimile.

The security communication control system according to the present invention intervenes between the originating and answering terminal equipment, so there is no need to modify or change the terminal equipment. Therefore, as can be readily understood, the greater part of the facsimiles currently in use can be used directly for secure communication if combined with the secure communication control system according to the present invention.

It is required that the secure communication control system according to the present invention encode a transmit signal if the terminal equipment connected thereto is in the originating mode, or decode a receive signal if that terminal equipment is in the answer mode. Hence the inventive secure communication control system must be able to change its operating mode depending on the direction of the signal. As the secure communication control system of the invention is not connected directly to the terminal equipment except via the line, it cannot receive a control signal that signifies the signal direction directly from the terminal equipment. A manual switch may solve the situation, but the operator will feel it troublesome to operate it for mode changeover.

Thus, a preferred embodiment of the present invention, which will be explained later, is equipped with ringing detection means to detect a ringing signal on the line and hook signal detection means to detect a hook signal on the line. By checking whether the ringing signal or off-hook signal is detected first, the preferred embodiment automatically detects the signal direction, and selects its operating mode automatically.

BRIEF DESCRIPTION OF DRAWINGS

Various further and more specific objects, features and advantages of the present invention will appear from the description given below in connection with accompanying drawings illustrating by way of example a preferred embodiment of the present invention, in which.

DETAILED DESCRIPTION OF A PREFERRED EMBODIMENT

Figure 1:
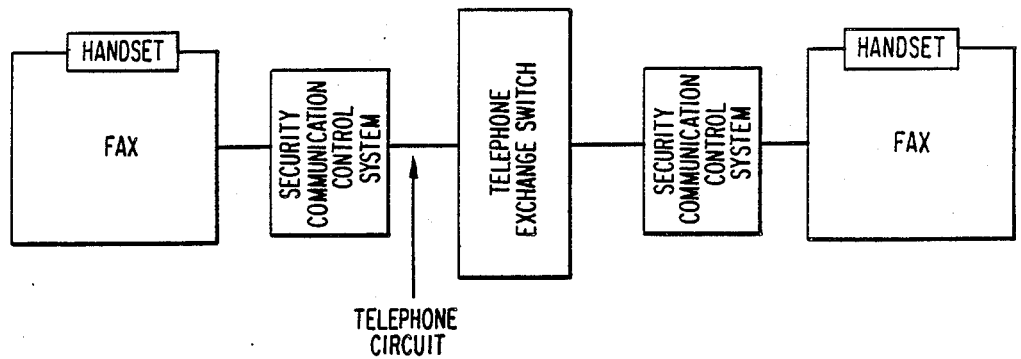
FIG. 1 is a block diagram of the overall configuration of a communication system to which the secure communication control system taken up as a preferred embodiment of the present invention is applied.

In FIG. 1, which shows the overall configuration of a facsimile communication system as a preferred embodiment of the present invention, there are shown two facsimiles (FAX) communicating with each other via a public switched telephone line. A security communication control system is provided between the telephone switch and each FAX. The FAX illustrated here is an unmodified CCITT G3 mode unit currently available on the market.

Conventional facsimiles can be used for secure communication only if a secure communication control system is placed between each facsimile and its public line.

Figure 2:
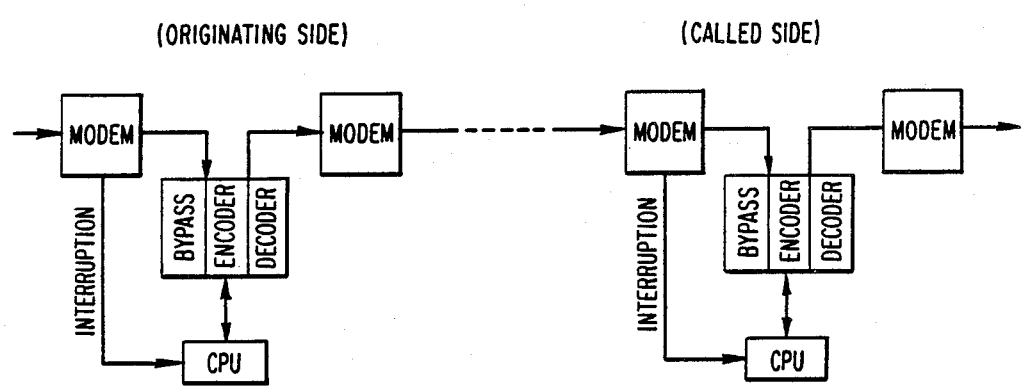
FIG. 2 is a block diagram outlining the configuration of the secure communication control systems installed at the originating and called stations.

FIG. 2 is a schematic representation of the secure communication control systems as used for transmitting and receiving facsimiles. As shown, both secure communication control systems have identical configurations. That is, each secure communication control system has two modulator/demodulators (modems), one central processing unit (CPU), and a unit for bypassing, encoding and decoding signals.

Secure communication is carried out as follows. On the transmitting side, the outgoing image signal sent out of the transmitting facsimile is fed into a modem, encoded, and then transmitted via another modem to the line. On the receiving side, the encoded image signal sent over the line is fed into a modem, demodulated, decoded into a deciphered image signal, which is then sent to the receiving facsimile via another modem.

As explained above, the transmitting and receiving facsimiles need only perform their normal functions, but the signal on the line between the transmitting and receiving secure communication control systems nonetheless is encoded for secure communication.

Figure 3:
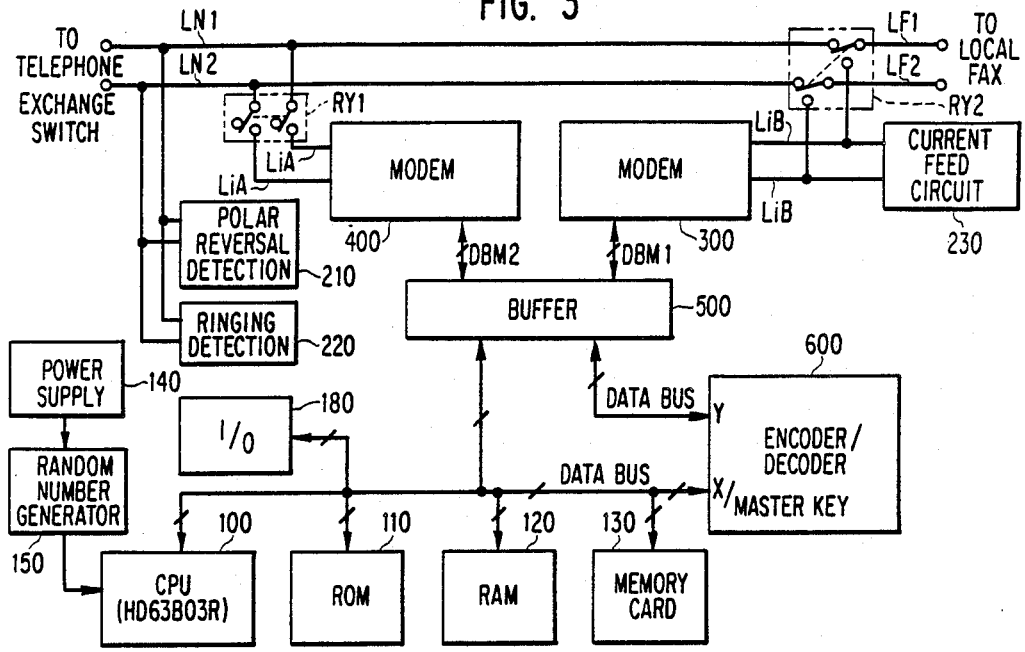
FIG. 3 is a block diagram showing the configuration of the secure communication control system as a preferred embodiment of the present invention.

FIG. 3 shows the configuration of a secure communication control system. There is a relay, RY2, between the network side line wires LN1, LN2 and the facsimile side line wires LF1, LF2. The facsimile side line wires LF1, LF2 are terminated at the common terminals of the relay RY2, and the network side wires LN1, LN2 terminate at normally-closed terminals or normally-open terminals of the relay RY2.

The internal wires LiB of the secure communication control system terminate at the normally-open or normally-closed terminals of the relay RY2 whichever will become opposed to the termination of the network side wires LN1, LN2. In the illustrated example, when the relay RY2 is off, the network side wires LN1, LN2 and facsimile side wires LF1, LF2 are connected together. On the other hand, when the RY2 is on, the facsimile side wires LF2, LF2 are connected to the internal wires LiB of the secure communication control system.

Further, the network side wires LN1, LN2 are connected to the internal wires LiA of the secure communication control system via the normal-open terminals of the relay RY1. In addition, the network side wires LN1, LN2 are connected to a polarity reversal detection circuit 210 and ringing detection circuit 220, and the internal wires LiB of the secure communication control system are connected to a current feed circuit 230.

Other components of the security communication control system include: microcomputer (CPU) 100, read-only memory (ROM) 110, random access memory (RAM) 120, memory card 130, power supply 140, random number generator 150, input/output interface (I/O) 180, modems 300, 400, buffer circuit 500, and encoder/decoder circuit 600.

The two modems 300, 400 are provided with communication functions in accordance with CCITT V27ter, i.e., G3 functions. The data bus of the microcomputer 100 is connected to the data bus DBM1 of modem 300 and the data bus DBM2 of modem 400 via buffer circuit 500. Accordingly, the microcomputer 100 can communicate with the local facsimile referenced in FIG. 3 via modem 300 or with the far-end facsimile via modem 400.

The buffer circuit 500 and encoder/decoder circuit 600 are connected together via internal data bus (2). By controlling the buffer circuit 500, the data bus (2) can be connected to the data bus DMB1 of modem 300 or to the data bus DBM2 of modem 400.

Accordingly, when the facsimile is in the originating mode, the image signal to be encoded is supplied to modem 300 via wires LiB, is demodulated, is supplied to the data bus of the microcomputer 100 by way of data bus DBM1 and buffer circuit 500, and is applied to the X-group terminal of the encoder/decoder circuit 600. The encoder/decoder circuit 600 encodes the signal applied to its X-group terminal, and supplies the encoded signal to data bus (2) via its Y-group terminal. The encoded signal from the Y-group terminal is supplied to the data bus DBM2 via the buffer circuit 500, and is modulated through modem 400 and sent out to the network side wires LN1, LN2 via the internal wires LiA.

On the other hand, if the facsimile is in the receiving mode, the encoded image signal to be decoded enters modem 400 via the internal wires LiA, is demodulated, passes from data bus DBM2 to data bus (2) through buffer circuit 500, and enters the Y-group terminal of the encoder/decoder circuit 600. The encoder/decoder circuit 600 decodes the demodulated yet encoded image signal, and gives a demodulated and decoded image signal to its X-group terminal. This signal passes through the data bus of the microcomputer 100, and reaches modem 300 after passing through the buffer circuit 500 and at a bus DBM1. At modem 300, the signal is modulated and sent to the facsimile side wires LF1, LF2 over the internal wires LiB.

The memory card 130 is used as a key for secure communication, and can be plugged into and unplugged from the security communication control system. The memory card 130 is provided with a battery for memory backup and read-write memory which stores an ID code of the card. Thus, only when the transmitting and receiving facsimiles have their respective secure communication control systems each fitted with a memory card of the same ID code, can they communicate each with the other in a secure communication mode.

Figure 5A:
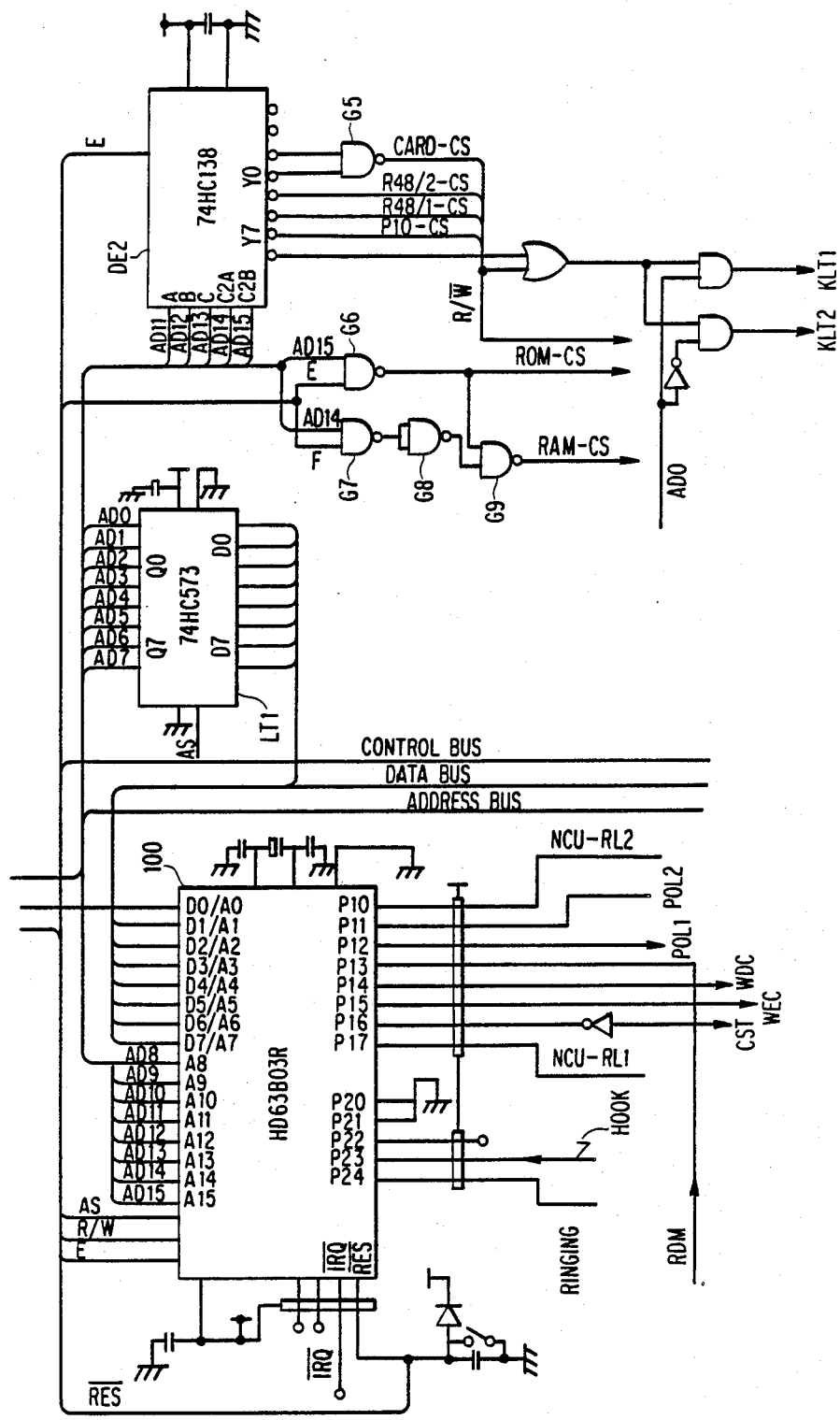
FIGS. 5a, 5b, 5c, 5d, 6a, 6b, 7a, 7b, 8, 9 and 10 are block diagrams showing in detail the components of the secure communication control system schematically shown in FIG. 4.

The component circuits of FIG. 3 are detailed in FIGS. 5a, 5b, 5c, 5d, 6a, 6b, 7a, 7b, 8, and 9. FIG. 5a shows the microcomputer 100 and its peripheral circuit elements. The microcomputer used herein is a HD63B03R. A latch LT1 functions as an address latch that extracts the lower 8-bit address data (A7-A0) superimposed on the data bus signal of the microcomputer 100. A 16-bit signal consisting of an upper 8-bit signal (AD15-AD8) directly generated from the microcomputer 100 and a lower 8-bit signal (AD7-AD0) generated from the address latch LT1 are carried on the address bus. Chip select signals selected by the peripheral circuits of the microcomputer 100 are generated by an address decoder composed of decoder DE2 and logic gates G5, G6, G7, G8, G9. In other words, when the address signal assigned to a specified peripheral circuit appears on the address bus, a corresponding chip select signal is decoded and turned active.

Figure 5B:
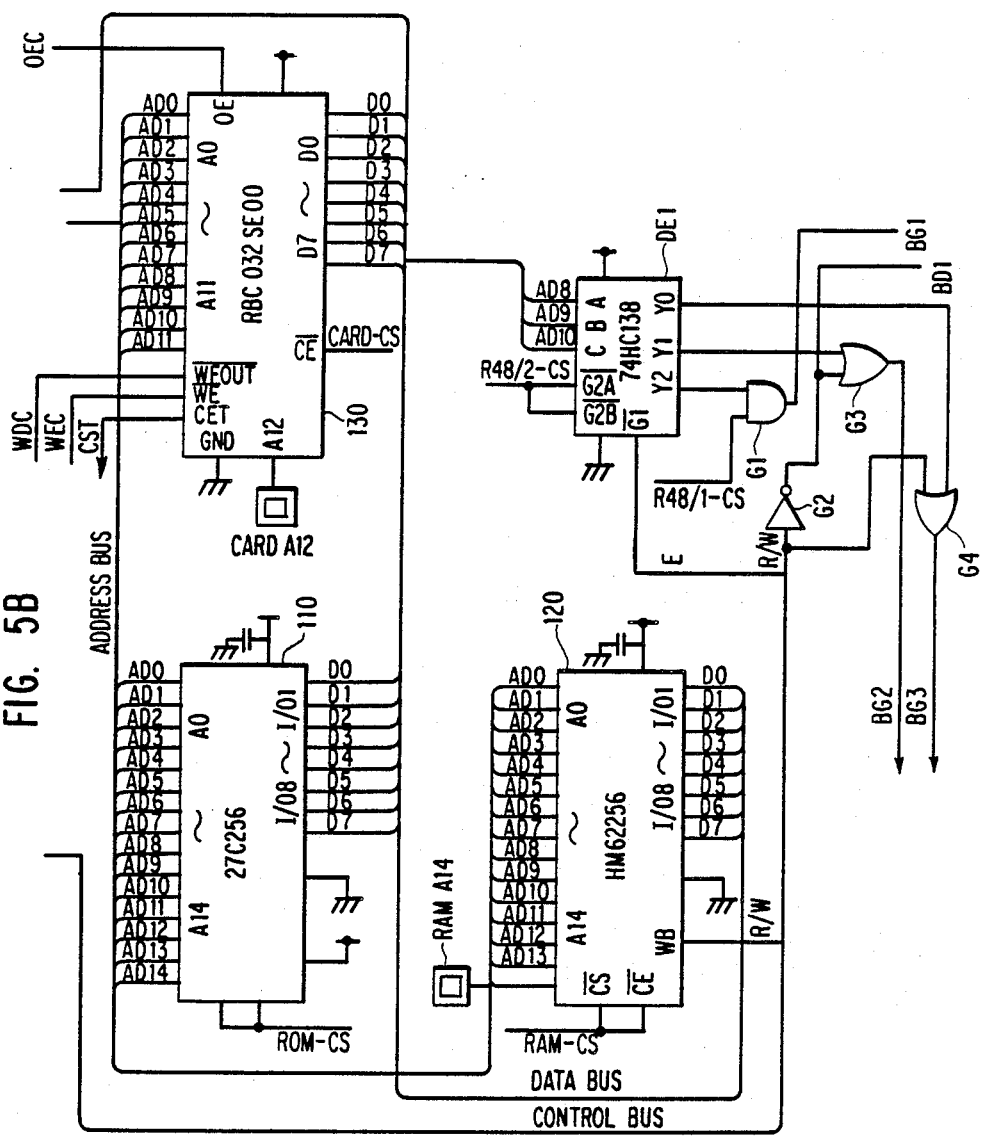

FIG. 5b shows ROM 110, RAM 120 and memory card 130, which are connected to the microcomputer 100 via the address bus, data bus and control bus. DE1 is a decoder. The memory card 130 is connected detachably to the secure communication control system with a connector (now shown in FIG. 5b).

Figure 5C:
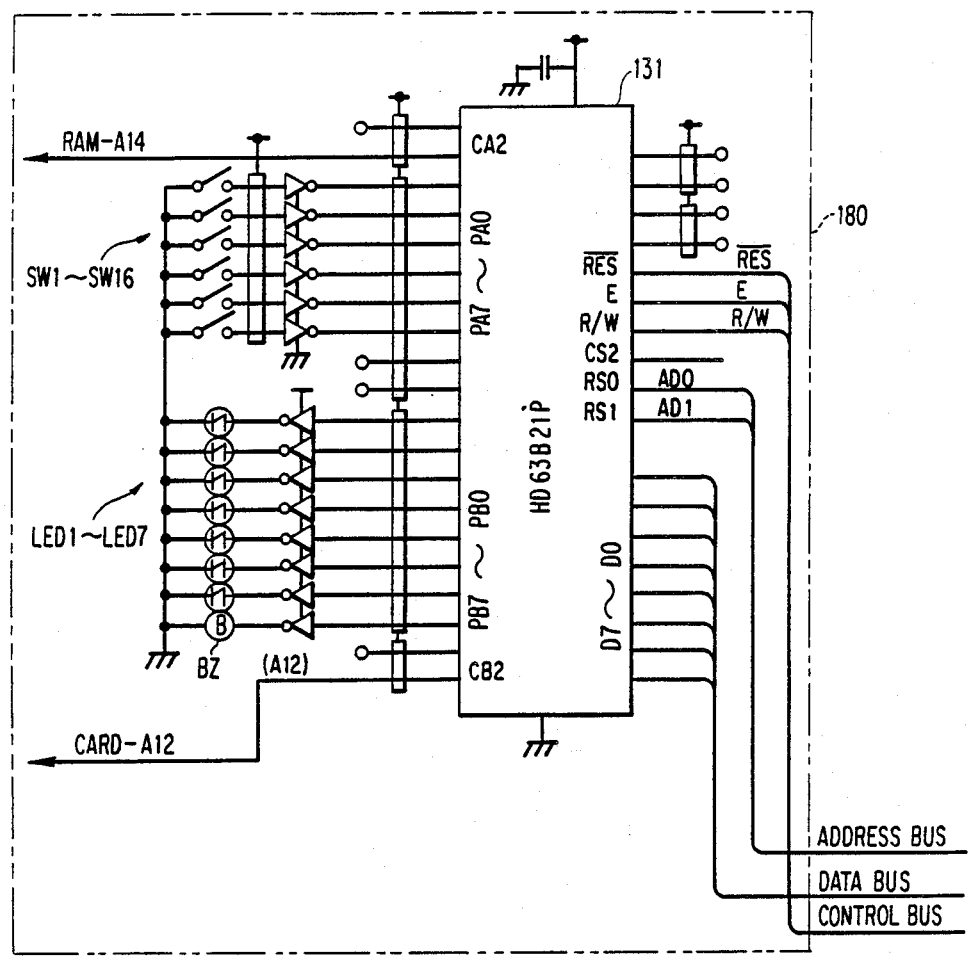

FIG. 5c shows an I/O interface 180, which is provided with: an integrated circuit 131 connected to the address bus, data bus and control bus of the microcomputer 100; and switches SW1-SW6, light-emitting diodes LED1-LRD7, buzzer BZ, and a buffer and driver connected to the ports of integrated circuit 131.

Figure 5D:
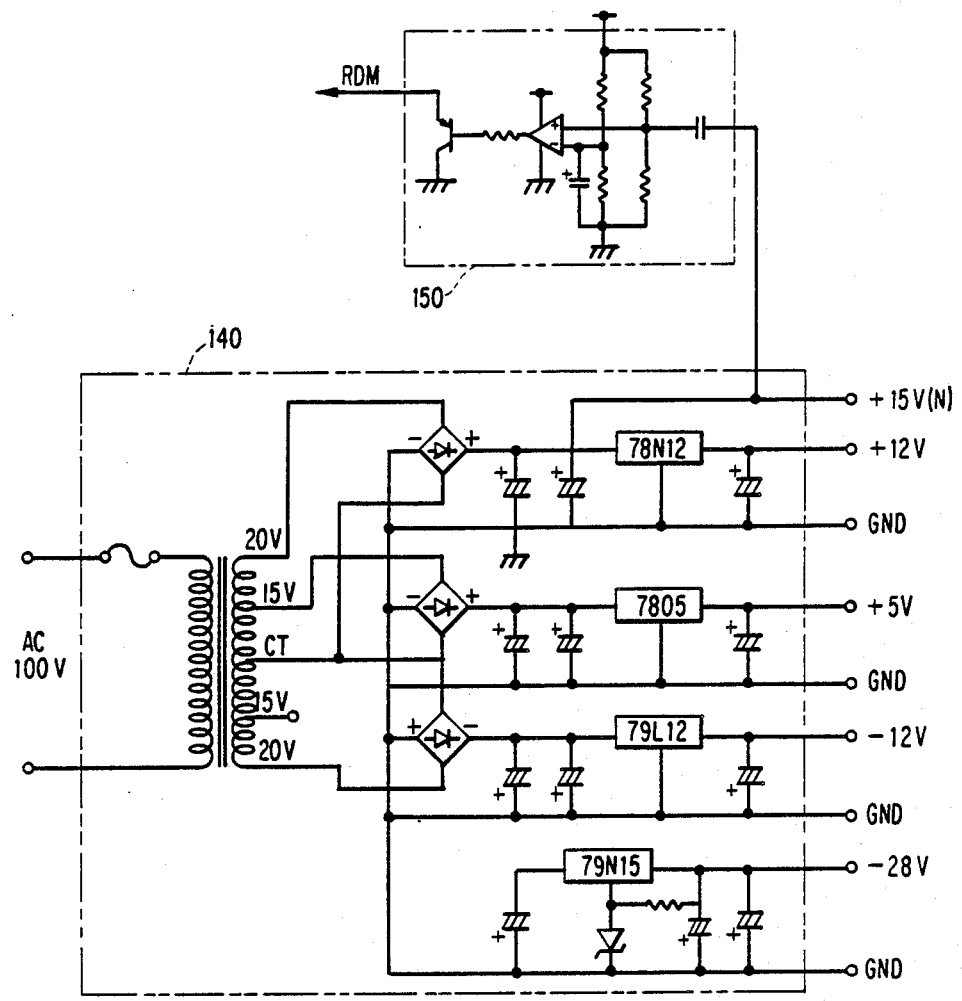

FIG. 5d shows a power circuit 1540 and a random number generator 150. The power circuit 140 is a widely accepted one that converts the commercial power (AC 100 V) into various DC voltages necessary for the security communication control system. The random number generator 150 forms an analog voltage comparator circuit in which the voltage at one of the two comparison input terminals is stabilized and the other is applied with a ripple voltage generated by the power circuit 140. This ripple voltage is obtained by the full-wave rectification of AC voltage (50 Hz), and contains an unceasing changing ripple component plus power line noise. The threshold level of the analog voltage comparator circuit is set halfway between the maximum and minimum levels of change of the ripple voltage. As a result, a pulse signal (RDM) of a low periodicity appears at the output terminal of the analog voltage comparator circuit. Nearly random data can be obtained by sequential sampling of the pulse signal (RDM), though it depends on the sampling of the pulse signal (RDM), though it depends on the sampling frequency. In the preferred embodiment, the generated random data is used as a key code for secure communication.

Figure 6A:
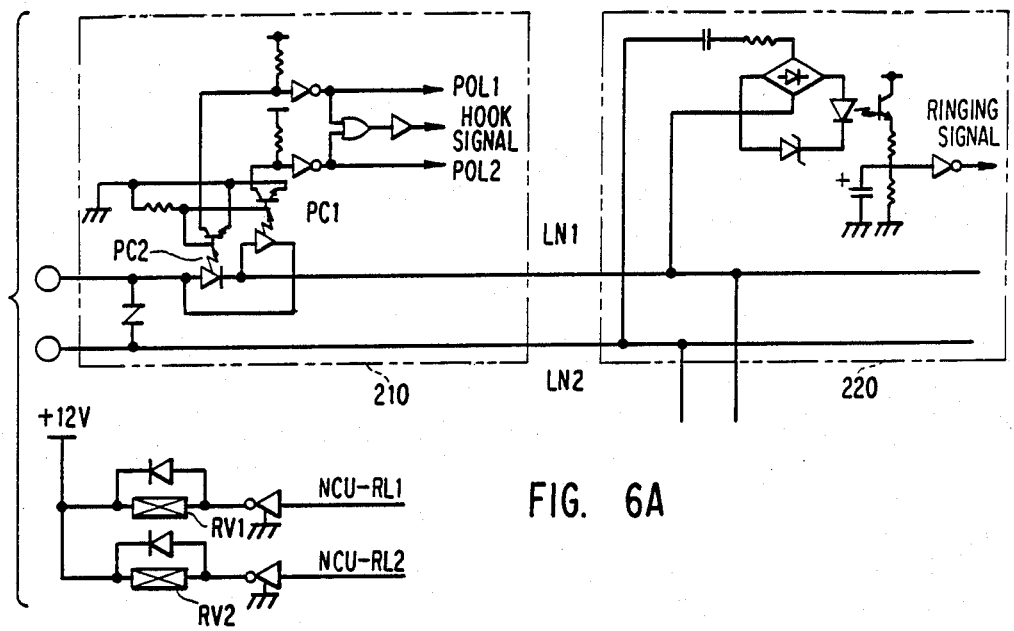

FIG. 6a shows the polarity reversal detection circuit 210, ringing detection circuit 220 and relays RY1, RY2. The relays RY1, RY2 are turned on and off by the output signals NCU-RL1, NCU-RL2 generated by the microcomputer 100. The polarity reversal detection circuit 210 checks whether the current is flowing through the network side wires LN1, LN2, and determines the direction of current if present. Photocouplers PC1, PC2 each consisting of a light-emitting diode and a photo-transistor are provided for the detection of current through the network side wire LN1. The light-emitting diodes of the photocouplers are connected parallel to each other, but in reverse polarity, and are connected in series to the network side wire LN1. Accordingly, if PC1 is turned on by a current, PC2 is turned off. If the current is reversed, PC1 is turned off, while PC2 is turned on. When no current flows through LN1, both photocouplers PC1, PC2 remain off.

The telephone circuit carries no current during an on-hook condition, but carries a current when off-hook. In the preferred embodiment, therefore, an off-hook signal is active whenever current is flowing in any direction. The signals POL1, POL2 are turned on and off depending on the direction of current, and are used to detect the polarity of the telephone circuit as the polarity of network side wires LN1, LN2 is toggled by the telephone exchange switch. This function also is used to make the voltage applied to facsimile side wires LF1, LF2 have the same polarity as the network side wires LN1, LN2 when the facsimile is switched from the network side wires LN1, LN2 to the secure communication control system.

The ringing detection circuit 220 detects whether a call signal is present on the network side wires LN1, LN2. In the ringing detection circuit 220, the DC component of the ringing signal is cut off by means of a capacitor, and the AC component alone s rectified through a full-wave rectifier. A calling signal is turned on when the output of the full-wave rectifier exceeds a specified level.

Figure 6B:
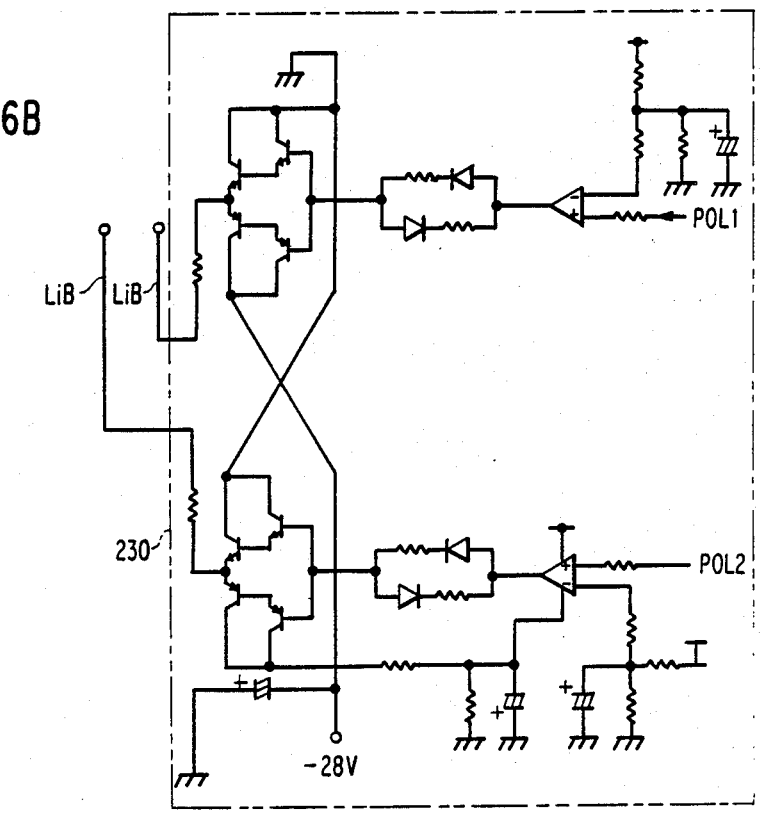

FIG. 6b shows a current feed circuit 230, which supplies a current to the facsimile side wires LF1, LF2 when the facsimile is switched from the network side wires LN1, LN2 to the internal wires LiB of the secure communication control system. The polarity signals POL1, POL2 generated by the polarity reversal detection circuit 210 are used to bring the polarity of the current in phase with that of the voltage in the network side wires LN2, LN2. Thus, even if the installed facsimile monitors the voltage and current of a line to which it is connected and performs control functions depending on the status of voltage and current, its switching from the line to secure communication control system will not cause any trouble. In the network side wires LN1, LN2, 48 V usually appears. But the current feed circuit 230 is designed to supply 28 V.

Figure 7A:
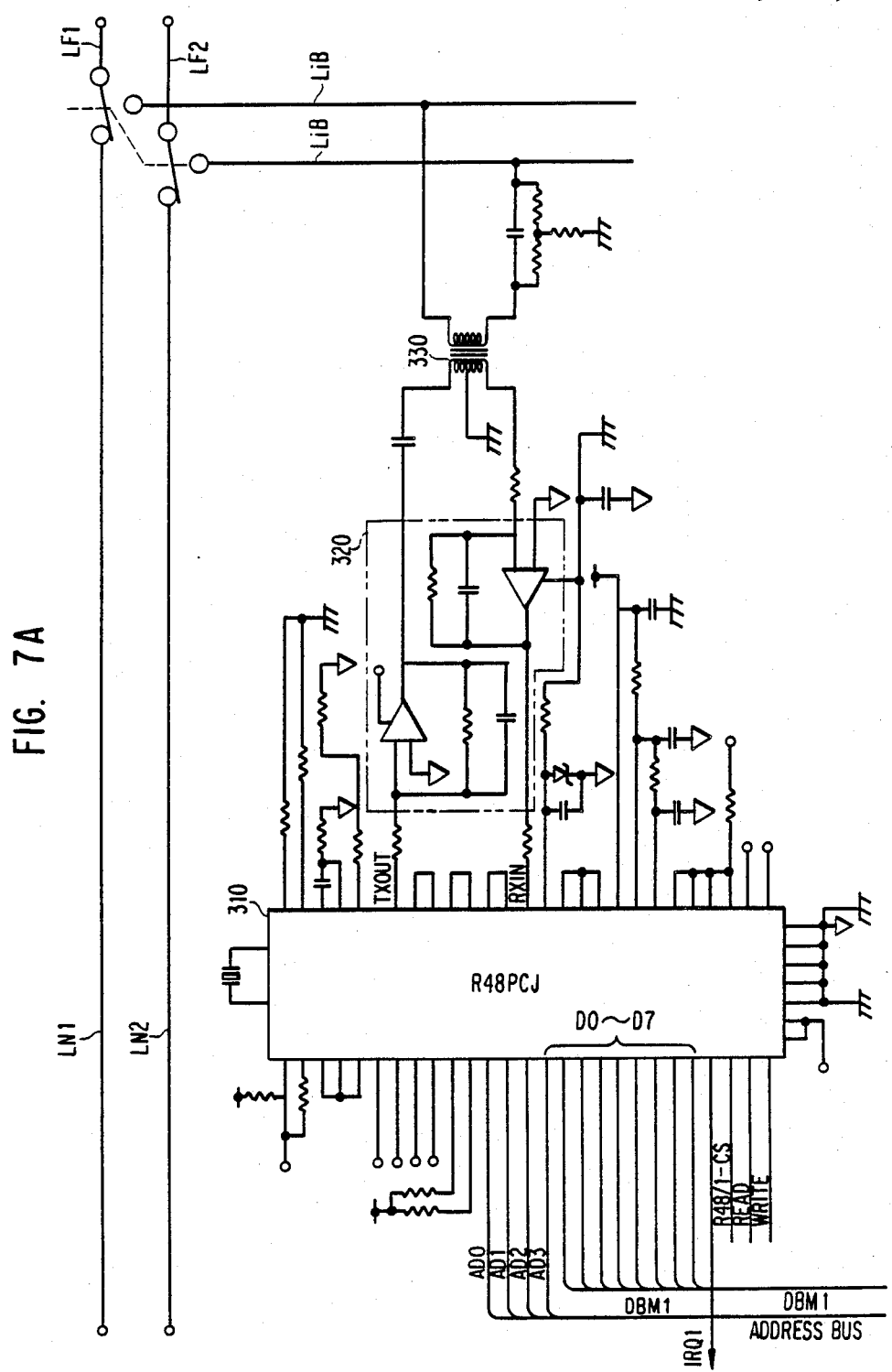

FIG. 7a shows a modem 300, the greater part of which is composed of a single-chip integrated circuit 310 (R48PCJ). This integrated circuit 310 has CCITT V27ter functions, including: a function that converts the digital signal applied to the data terminals D7-D0 to a serial signal, and sends it to the serial signal output terminal XOUT after modulation; and a function that demodulates the serial signal applied to the serial signal input terminal RXIN and sends it to the data terminals D7-D0 after conversion into parallel data.

The signal from the serial transmission output terminal TXOUT of the integrated circuit 310 passes through the signal processing circuit 320 and transformer 330 to the internal wires LiB of the secure communication control system. On the other hand, the input signal from the internal wires LiB passes through the transformer 330 and signal processing circuit 320 to the serial reception signal input terminal RXIN of the integrated circuit 310. The data terminals D7-D0 of the integrated circuit 310 are connected to the data bus DBM1.

Figure 7B:
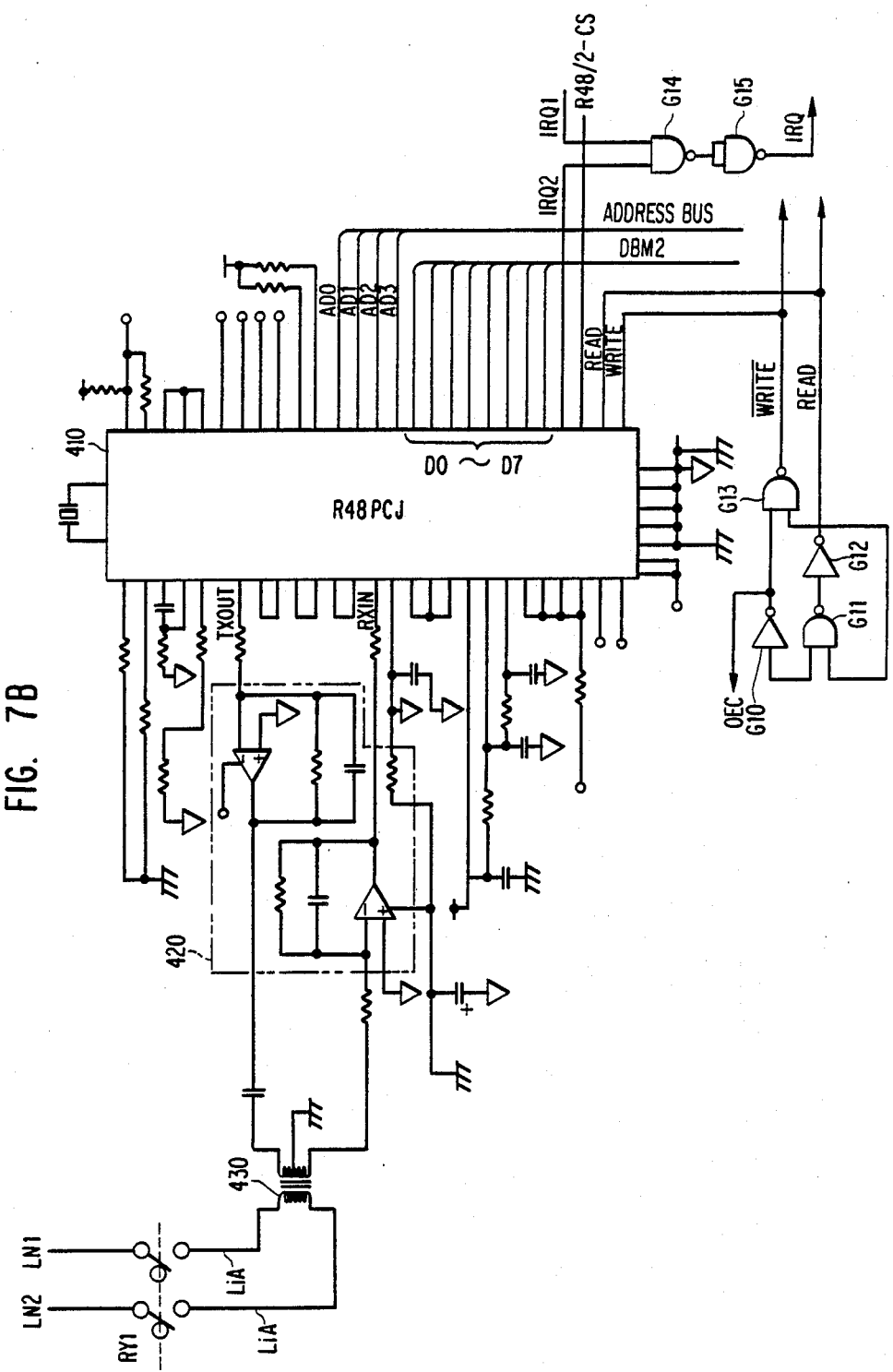

FIG. 7b shows a modem 400, the greater part of which is composed of a single-chip integrated circuit 410. This integrated circuit 410 is identical to the integrated circuit 310 referred to above. The signal from the serial transmission output terminal TXOUT of the integrated circuit 410 passes through the signal processing circuit 420 and transformer 430 to the internal wires LiA of the secure communication control system. On the other hand, the signal supplied to the internal wires LiA passes through the transformer 430 and signal processing circuit 420 to the serial reception signal input terminal RXIN of the integrated circuit 410. The data terminals D7-D0 of the integrated circuit 410 are connected to the data bus DBM2.

The logical sum of the interrupt request signal IRQ1 of modem 300 in FIG. 7a and the interrupt request signal IRQ2 of modem 400 in FIG. 7b is generated from the logic gate G15 and applied to the interrupt request input terminal INT of the microcomputer 100.

Figure 8:
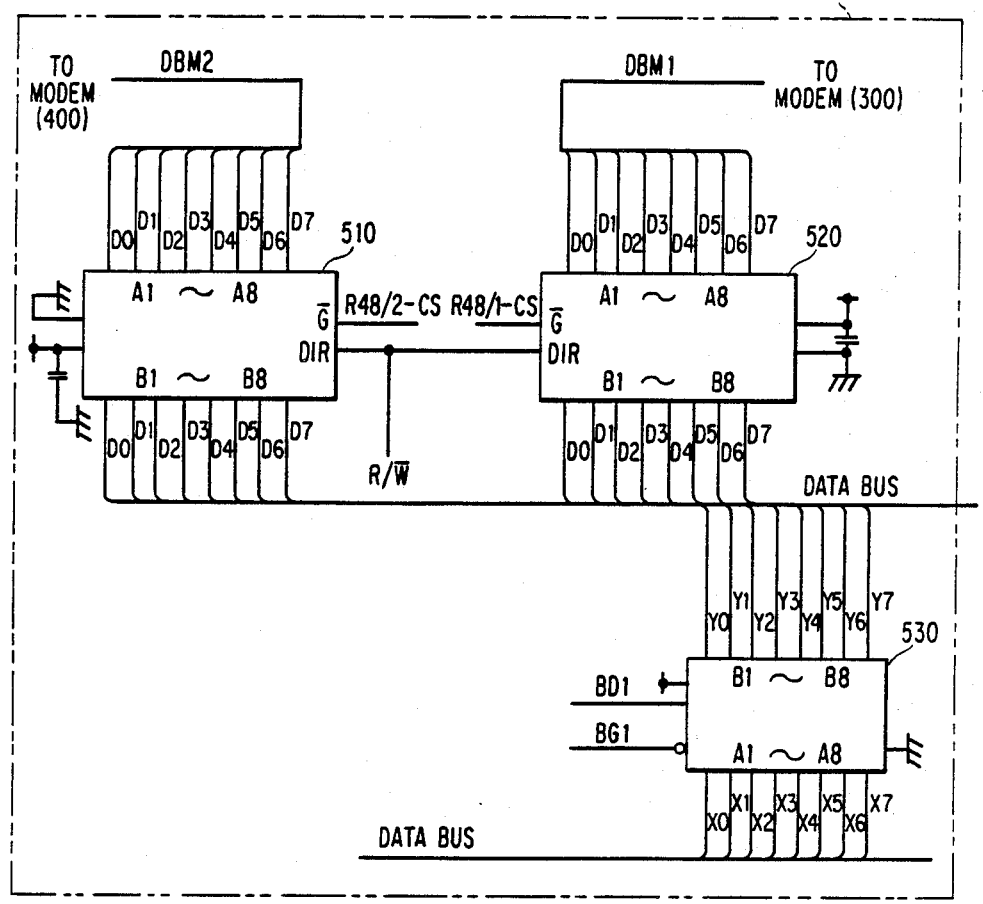

FIG. 8 shows a buffer circuit 500, which is composed of three integrated circuits 510, 520, 530 (74HC245), each serving as a bidirectional three-state bus buffer. The group-A terminals of the integrated circuit 510 are connected to the data bus DBN2 of modem 400; group-A terminals of the integrated circuit 520 are connected to the data bus DBM1 of modem 300; and group-A terminals of the integrated circuit 530 are connected to the data bus of the microcomputer 100. On the other hand, the group-B terminals of each of the integrated circuits 510, 520, 530 are connected to the internal data bus (2).

By controlling the integrated circuits 510, 530, data can be transmitted in any direction between the data bus of microcomputer 100, internal data bus (2) and the data bus DMB2 of modem 400. When the integrated circuits 520, 530 are controlled, data can be transmitted in any direction between the data bus of the microcomputer 100, internal data bus (2) and the data bus DBM1 of modem 300.

Figure 9:
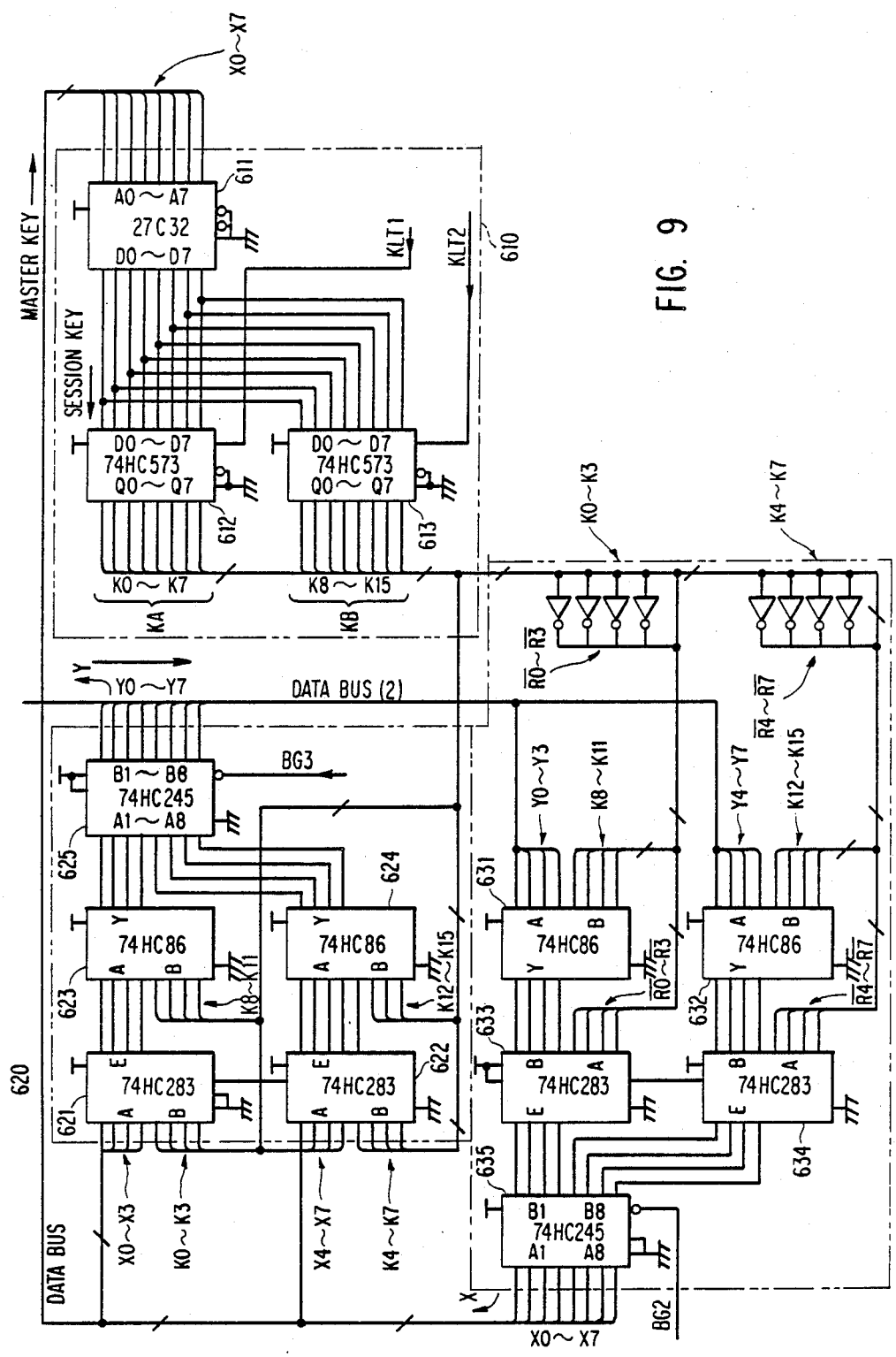

FIG. 9 shows the configuration of the encoder/decoder processing circuit 600 in detail. Its major components are a key code holding circuit 610, encoding circuit 620 and a decoding circuit 630. The key code holding circuit 610 is composed of a programmable ROM (PROM) 611 and two latches 612, 613. The microcomputer 100 supplies master key information to the address terminals A0-A7 of PROM 611. In PROM 611, a unique key code assigned to each separate address is stored. When an address is specified, a corresponding 8-bit key code is generated at the data terminals D0-D7.

By controlling the latch control signals KLT1, KLT2, the information generated by PROM 611 can be held by latches 612, 613. By changing the master key to be given to PROM 611 depending on whether the latch control signal KLT1 or KLT2 is generated, the data to be held by the latch 612 and that to be held by the latch 613 are made different from each other. The 8-bit data held by the latch 612 is used as a key code KA, while the 8-bit data held by the latch 613 is used as a key code KB. These key codes KA, KB are applied to the encoding circuit 620 and the decoding circuit 630, respectively.

The encoding circuit 620 is composed of 4-bit full adders 621, 622, exclusive OR circuits 623, 624 and a three-state output buffer 625. The group-A input terminals of the full adder 621 are supplied, via the data bus, with the lower 4-bit data X0-X3 of the information to be encoded, while the group-B input terminals are supplied with the lower 4-bit data K0-K3 of the key code KA. On the other hand, the group-A input terminals of the full adder 622 are supplied, via the data bus, with the upper 4 bits X4-X7 of the information X to be encoded, while the group-B input terminals are supplied with the upper 4 bits K4-K7 of the key code KA. The carry output of the full adder 621 is applied to the input terminals of the full adder 622. The signals from group-E output terminals of the full adders 621, 622 are supplied to the group-A input terminals of the exclusive OR circuits 623, 624, respectively.

The group-B input terminals of the exclusive OR circuit 623 are supplied with the lower 4 bits K8-K11 of the key code KB, and the group-B input terminals of the exclusive OR circuit 624 are supplied with the upper 4 bits K12-K15 of the key code KB. The 4-bit signals from the output terminals Y of the exclusive OR circuits 623, 624 are passed through the buffer 625 and generated to the data bus 2 as an 8-bit encoded signal Y.

The decoding circuit 630 is composed of 4-bit full adders 633, 634, exclusive OR circuits 631, 632, a three-state output buffer 635 and a group of inverters. The group-A input terminals of the exclusive OR circuit 631 are supplied, via internal data bus 2, with the lower 4 bits Y0-Y3 of the encoded signal Y, while the group-B input terminals are supplied with the lower 4 bits K8-K11 of the key code KB. On the other hand, the group-A input terminals of the exclusive OR circuit 632 are supplied, via internal data bus (2), with the upper 4 bits Y4-Y7 of the encoded signal Y, while the group-B input terminals are supplied with the upper 4 bits K12-K15 of the key code KB.

The signals from group-Y output terminals of the exclusive OR circuits 631, 632 are supplied to the group-B input terminals of full adders 633, 634, respectively. The group-A input terminals of the full adder 633 are supplied with the toggled lower 4 bits K0-K3 of the key code KA, while the group-A input terminals of the full adder 634 are supplied with the toggled upper 4 bits K4-K7 of the key code KA. The 4-bit signal from the full adder 633 and the 4-bit signal from the full adder 634 are delivered to the data bus of the microcomputer 100 as a decoded 8-bit signal X.

Figure 4:
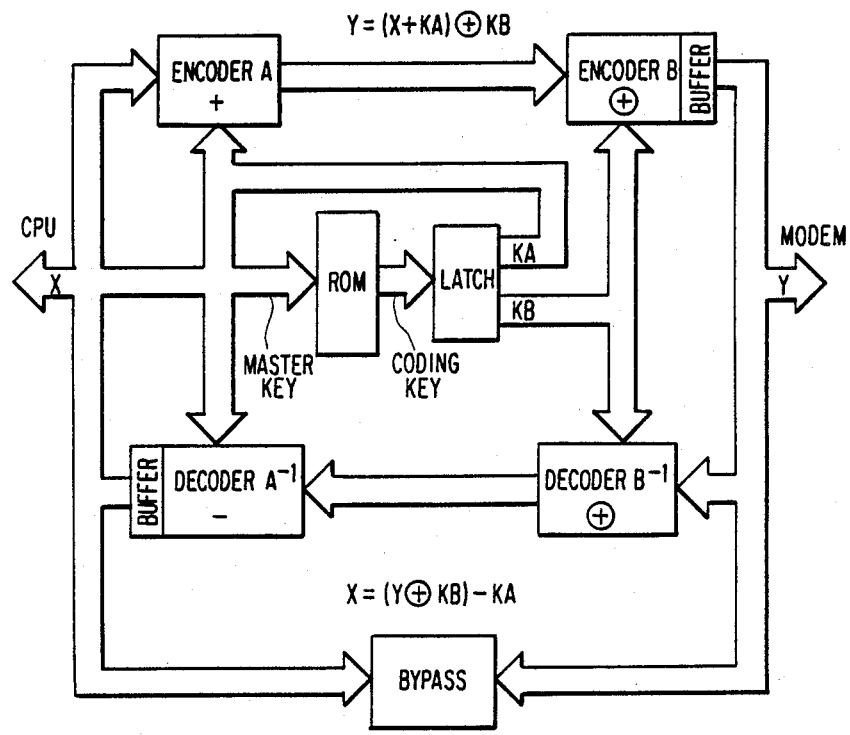
FIG. 4 is a block diagram outlining the functions of the encoder/decoder processing circuit 600.

The aforesaid encoding circuit 620 and decoding circuit 630 are basically the same as the conventional ones, and accordingly an explanation thereof is omitted here. The operations of the encoder/decoder processing circuit 600 shown in FIG. 9 are shown schematically in FIG. 4 for reference.

Figure 10:
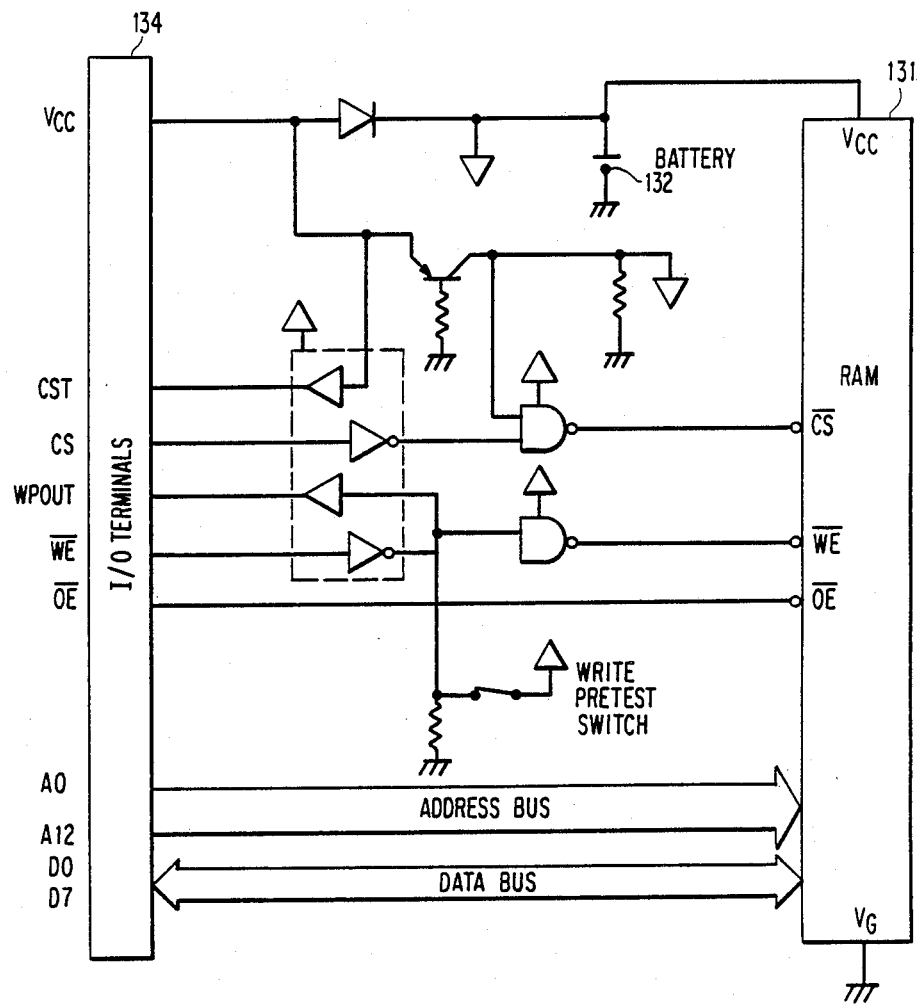
Figure 11A:
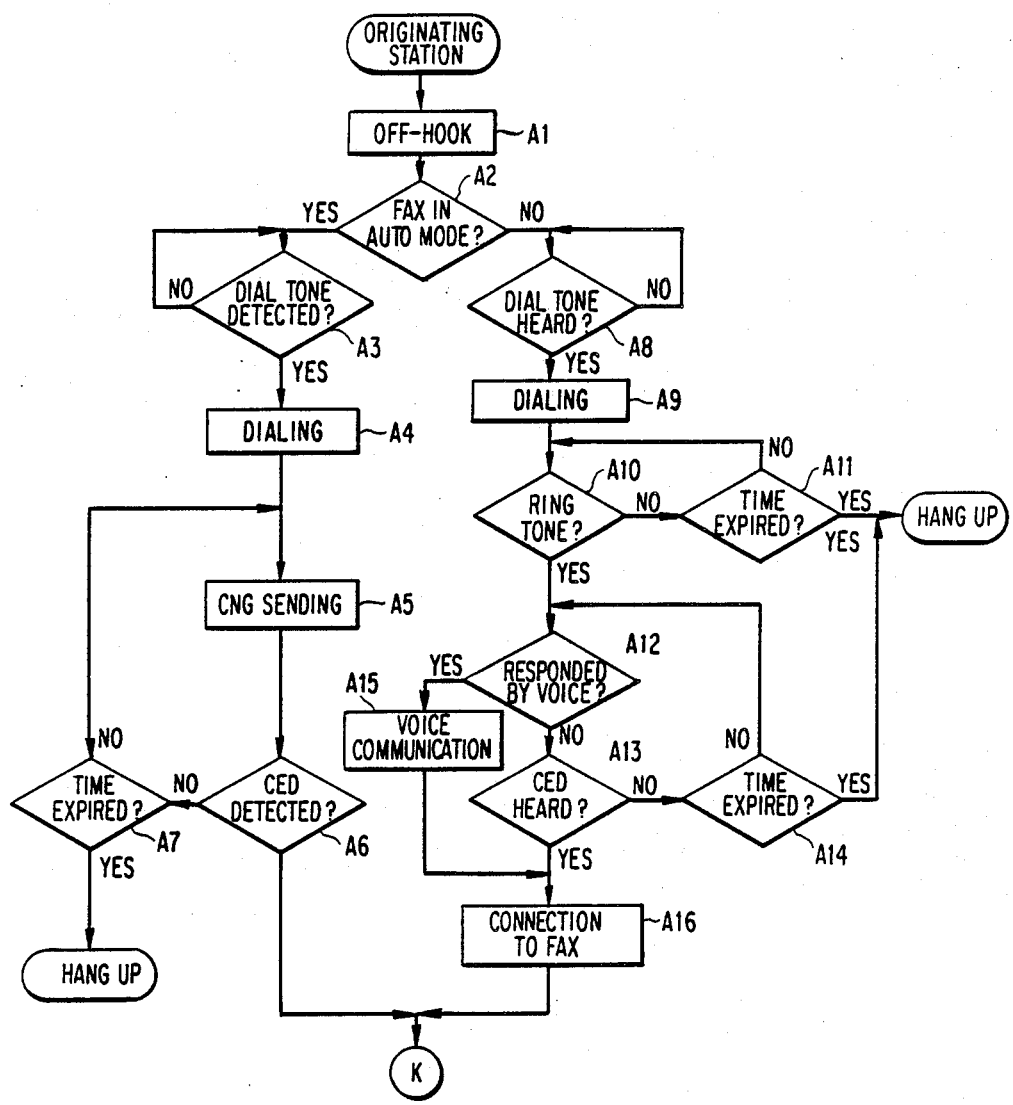
FIGS. 11a, 11b, 11c, 11e, 11f and 11g are flowcharts showing the process of communication between the originating and called facsimiles.
Figure 11B:
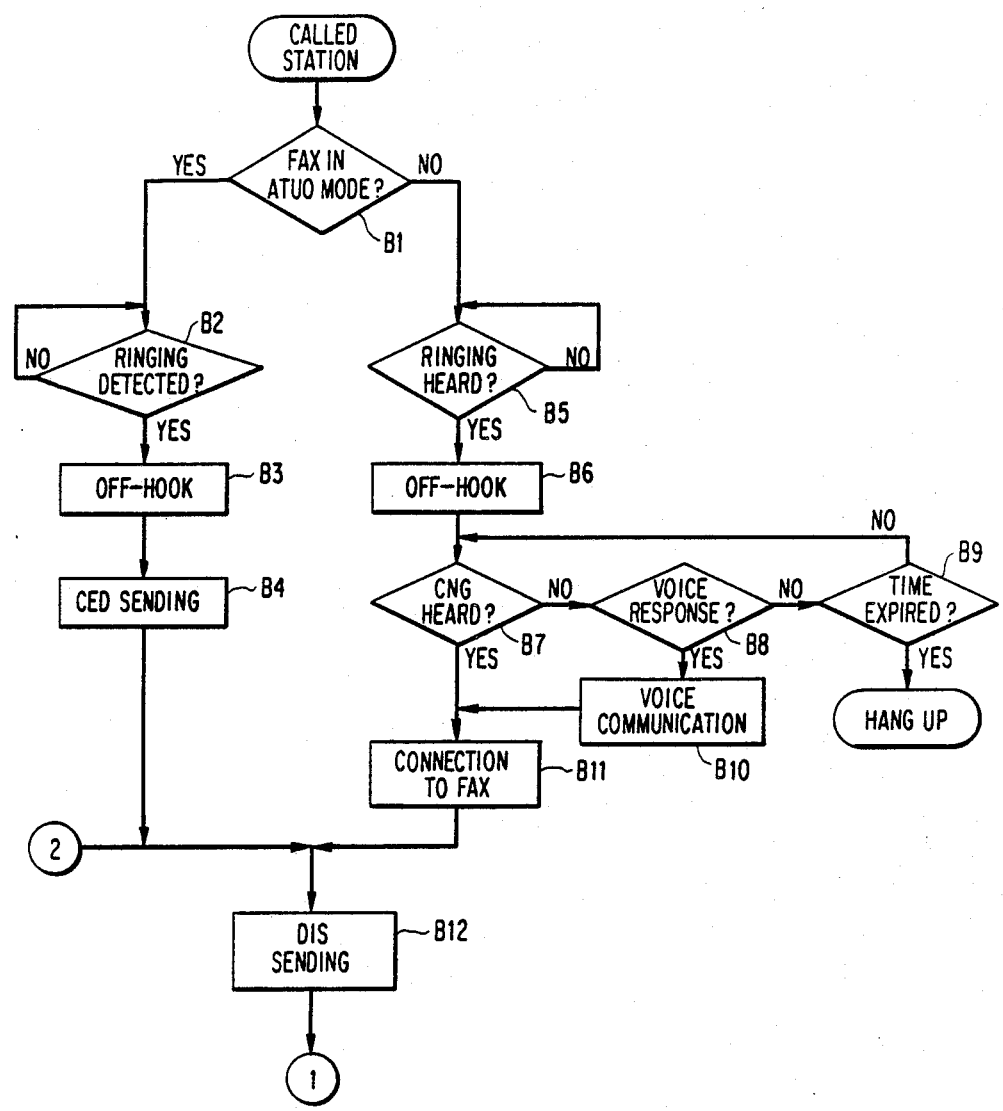
Figure 11C:
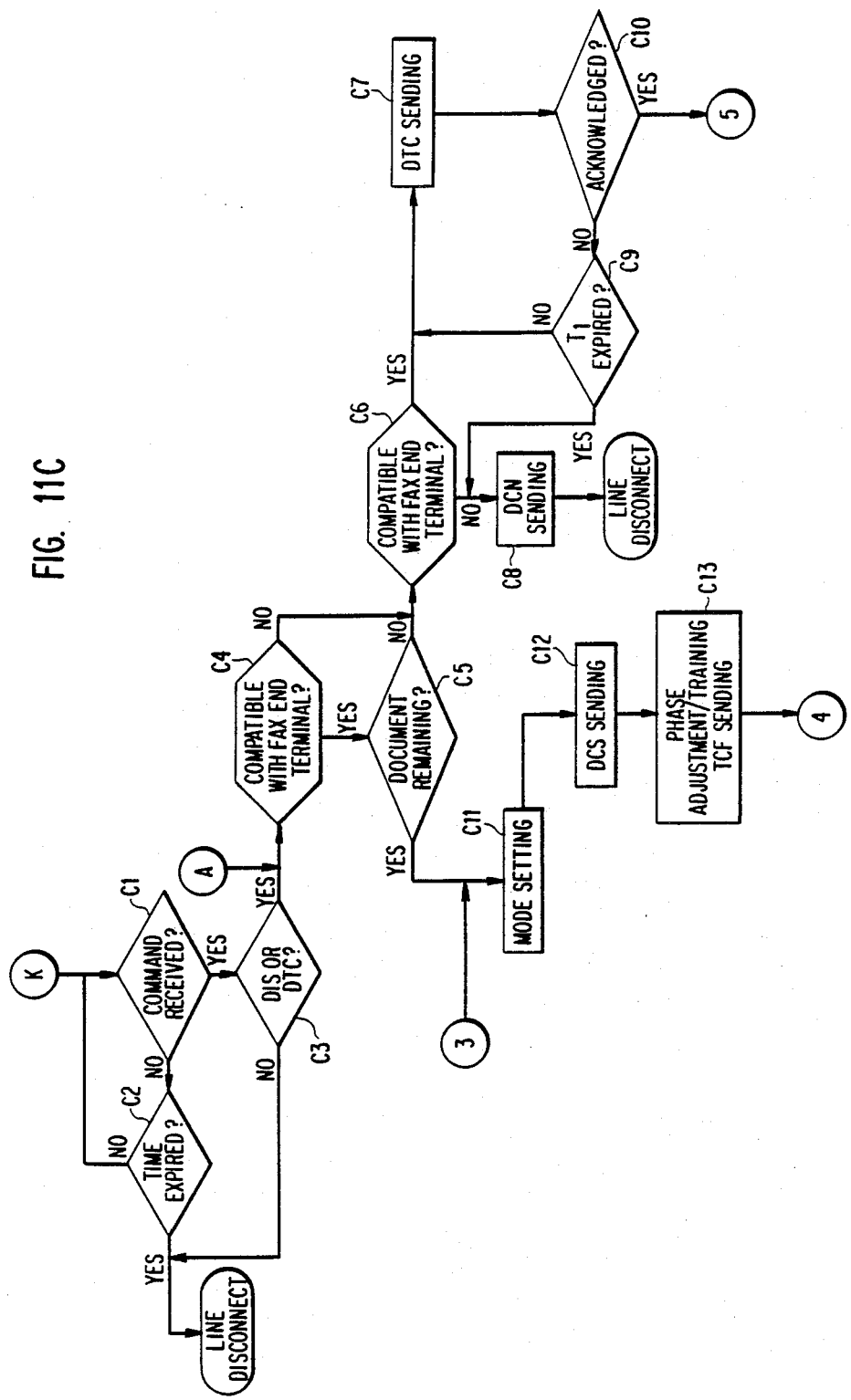
Figure 11D:
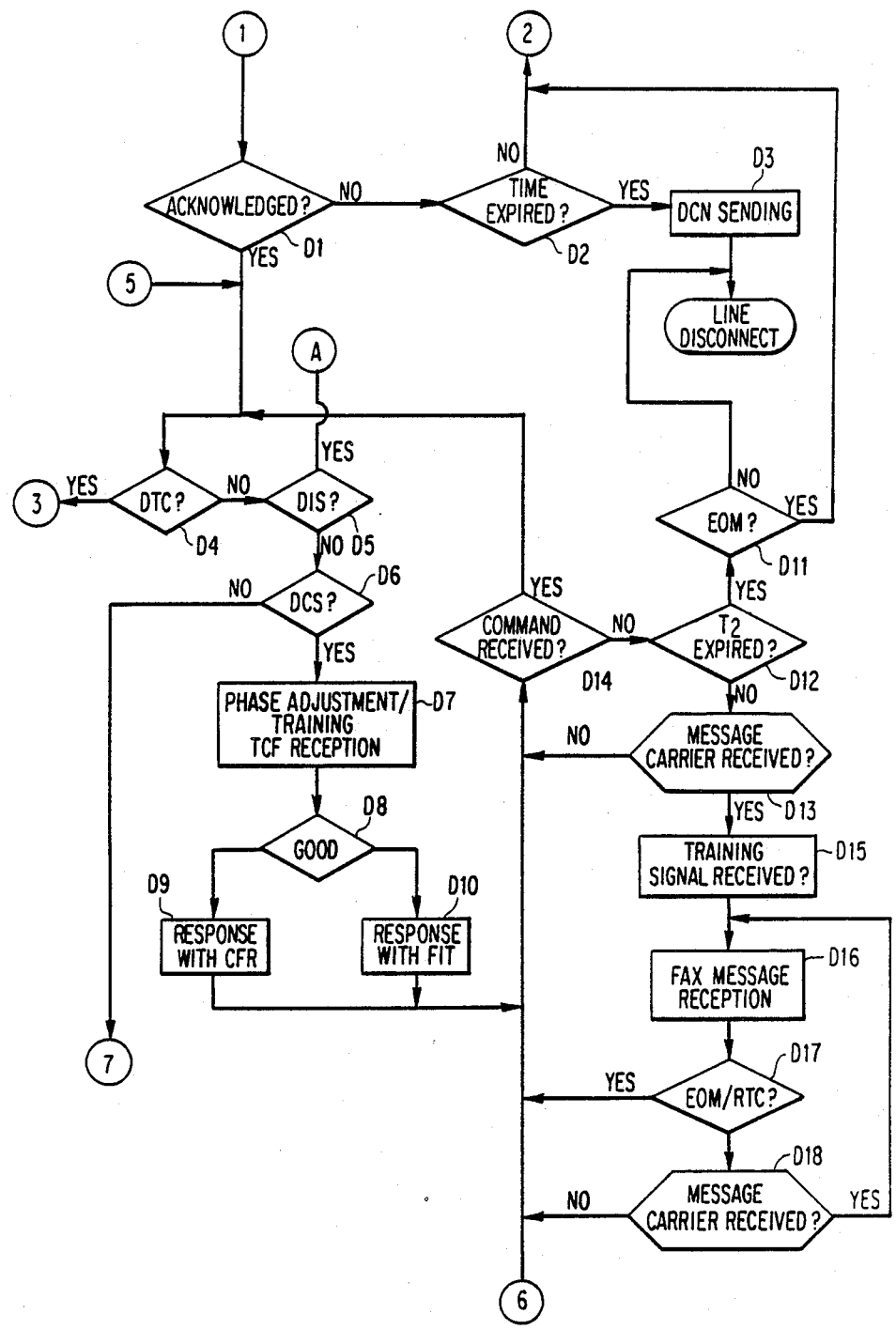
Figure 11E:
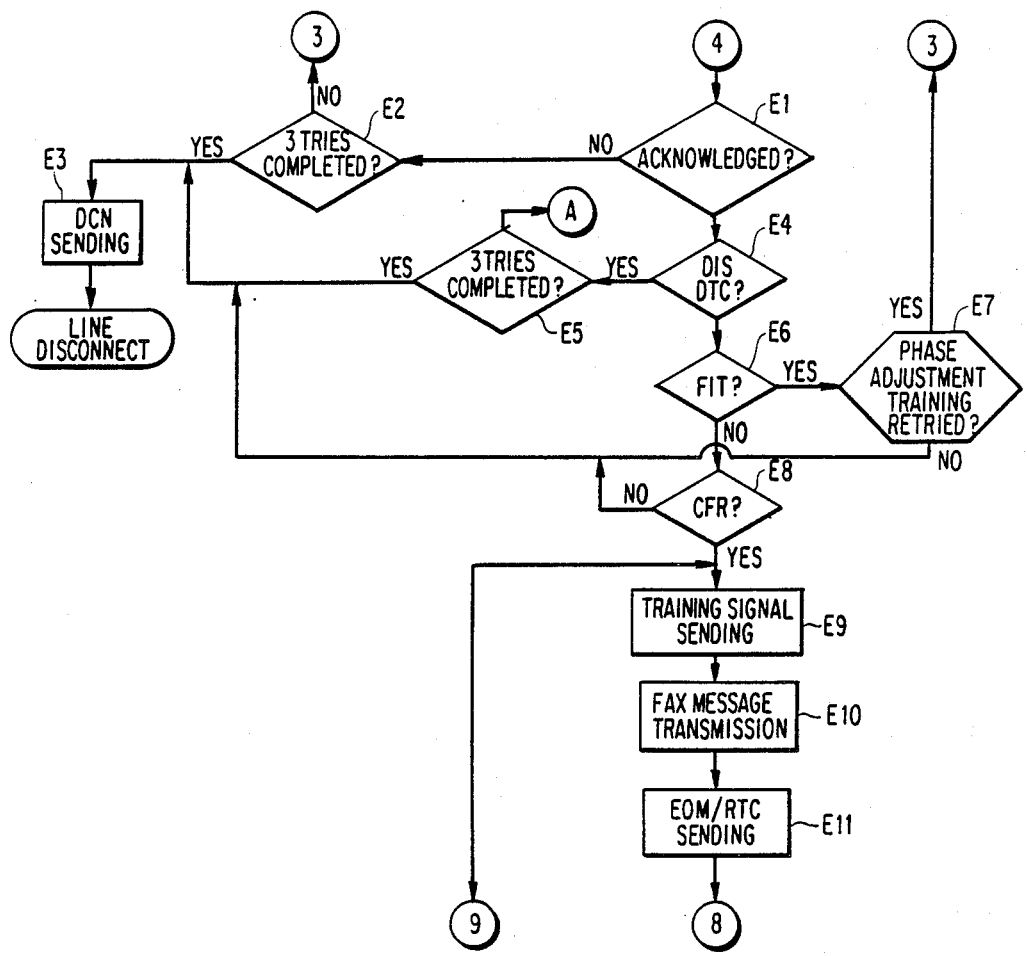
Figure 11F:
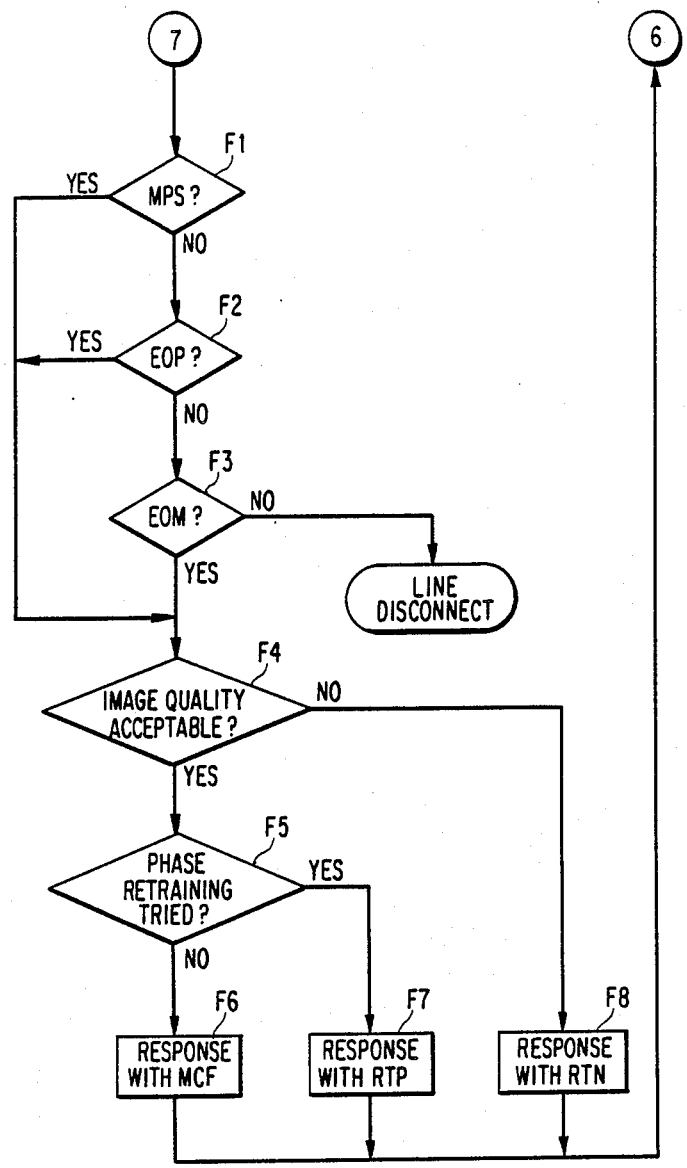
Figure 11G:
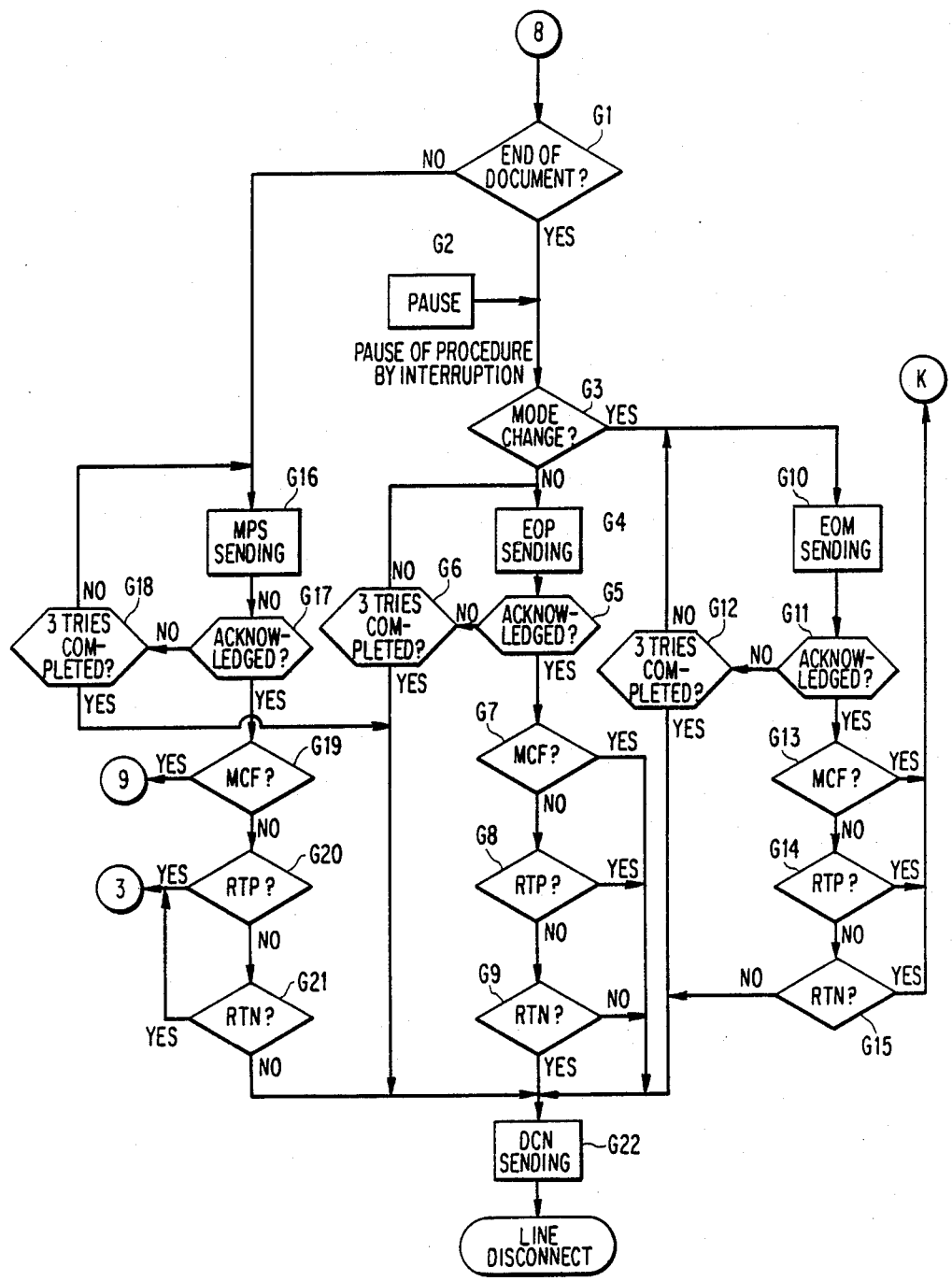

FIG. 10 illustrates the internal structure of the memory card 130 used in the preferred embodiment of the invention. The memory card 130 is composed of a read-write random access memory (RAM) 131, a battery 132, a control circuit, and a connector 134. With the connector 134, the memory card 130 can be plugged into and unplugged from the secure communication control system. The terminals of the connector 134 are assigned to the power line (Vcc), card set signal terminal CST, chip select signal terminal CS, write control output WPOUT, write control input WE, output enable input OE, address bus A0-A12, and data bus D0-D7. The RAM 131 has an ID code written thereto that is assigned to the memory card. In the preferred embodiment, the secure communication control systems on both the transmitting and receiving sides need a memory card with the same ID code.

Actual secure communication is carried out as follows. The operations of facsimiles communicating with each other are shown in FIGS. 11a, 11b, 11c, 11d, 11e, 11f, and 11g. The operations of the secure communications control systems are shown in FIGS. 12a, 12b, 12c, 12d, 12e, 12f, 12g, 12h, 12i, 12j and 12k. The operations of the facsimiles themselves are the same as those of the conventional ones, and are explained briefly here. The flowchart of FIGS. 11a-11g provide more detail regarding communications protocol between facsimiles. For ease of description, detailed narration of those flowcharts is omitted here, but a full understanding may be derived by referring to those flowcharts, and will be apparent to those of working skill in this technological field.

The following explanations refer to a communication control system illustrated in FIG. 1. In the following explanations, the symbols recommended by CCITT are used parenthetically for the signals used in the communication processing. Also, it is to be understood that the explanations here are given on the assumption that both the calling and called facsimiles are operated in the automatic mode.

At the originating facsimile, the operator goes off-hook (corresponding to taking up the handset, in the case of a telephone) and dials the telephone number of the party on the other end of the line after detecting the dial tone from the local exchange. (See FIG. 11a). The called facsimile goes off-hook when it detects a ringing tone from its local exchange, and at the same time places to the line a called equipment discrimination signal (CED) that shows that the called station is a facsimile. Until the CED signal is detected, the originating facsimile continues to send a calling tone (CNG) that shows the calling station is a facsimile.

As soon as the CED signal is detected, the originating facsimile goes into a facsimile communication mode.

After sending the CED signal, the called facsimile sends a digital identification signal (DIS) to inform the originating facsimile of its communication capability (G1, G2, G3, etc.). The originating facsimile checks the DIS signal sent from the called facsimile, and determines whether its capability goes well with the capability of the called facsimile. Then, the originating facsimile selects a communication mode compatible with both the originating facsimile itself and the called facsimile, and responds to the DIS signal with a digital instruction signal (DCS).

A training check signal (TCF) then is sent to check the line status. After reception of the DCS signal, the called facsimile receives the TCF signal in a specified mode, and returns a signal (CFR or FTT) showing the result of reception to the originating facsimile.

If the originating facsimile judges, based on the returned result, that the communication is in good condition, it proceeds to a message transmission step. If the communication condition is poor, the communication mode is changed (usually, the baud rate is reduced), and the TCF signal is forwarded to the called facsimile again. Upon reception of a CFR signal from the called facsimile, the originating facsimile sends a training signal to bring the called facsimile in synchronism. Following this, a message is sent from the originating to the called facsimile. Upon reception of the training signal, the called facsimile synchronizes itself with the originating facsimile and receives the message from the originating facsimile.

While the originating facsimile is sending a page of a document, the called facsimile continues to receive it until it detects an end-of-page signal (RTC).

When a complete page of document has been sent, the originating facsimile checks whether all pages of the document have been sent. If there are more pages to be transmitted, the originating facsimile sends a multi-page signal (MPS), and then receives an acknowledged signal (MCF) or a retraining signal (RTP or RTN) from the called facsimile. Depending on the signal received from the called facsimile, the originating facsimile may change the transmission mode, send a training signal, or disconnect the line.

If the page just sent is the end of the document, the procedure is interrupted, and judgment is made as to whether the mode should be changed. If there is no need to change the mode, the end-of-procedure signal (EOP) is sent, and then the line is disconnected.

When it is required to change the mode, the originating facsimile waits for the DIS signal after reception of an MCF, RTP or TRM signal. The called facsimile responds to the originating facsimile's signal (MPS, EPO or EOM (end-of-message)) with an MCP, RTP or RTN signal, and returns to a standby state to await a command. In all other cases, the called facsimile initiates the line disconnection operation.

The secure communication control system functions as follows. In the ensuing description, extensive reference will be made to the flowcharts of FIGS. 12a–12j. Those flowcharts provide greater detail which, for ease of description, is not repeated in this narrative, but which will be apparent to those of working skill in this technological field.

Figure 12A:
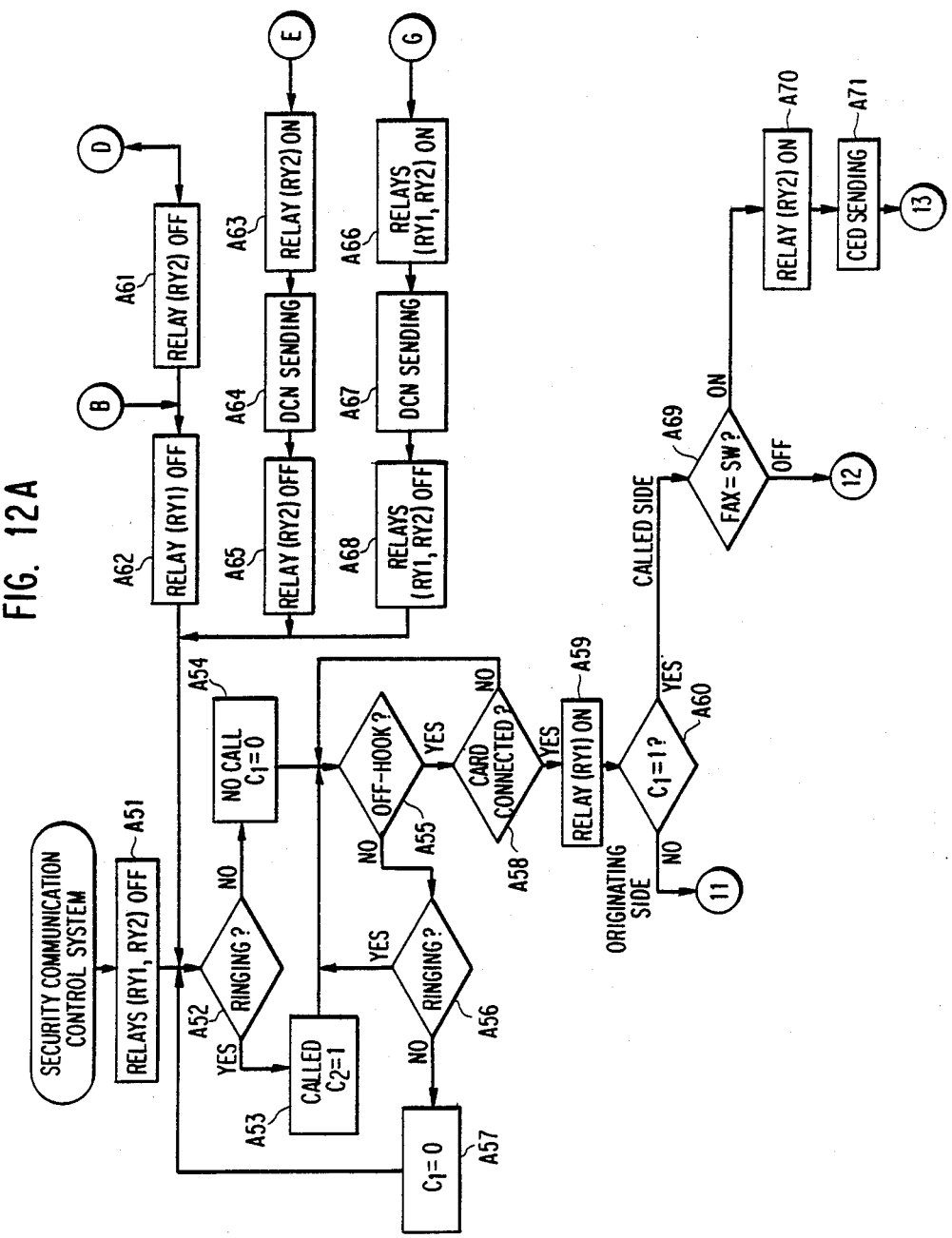
FIGS. 12a, 12b, 12c, 12d, 12e, 12f, 12g, 12h, 12i, 12j and 12k are flowcharts showing the operations of the secure communication control system of the invention.

First, the secure communication control system judges whether the facsimile to which it belongs is in the originating mode or answer mode, by checking the output signal of the ringing detection circuit 220 in step A52 in FIG. 12a. In step A55, the hook signal generated by the polarity reversal detection circuit 210 is checked. By determining whether the ringing signal or off-hook signal is detected earlier, it is judged whether the facsimile is an originating or a called facsimile.

If the facsimile is called, the ringing signal is detected earlier, and thus the register (C1) stores 1 in step A53. If the facsimile is originating, the register (C1) stores 0 in step A54, and then an off-hook signal is detected to proceed to the next step. Thereafter, it is possible to judge, by checking contents of the register (C1) whether the facsimile is in the originating or answer mode.

Then, it is judged whether a memory card 130 is attached to the secure communication control system. This is done by refer-ring to the card set signal (CST) generated from the memory card 130. If a memory card is set to at least one of the originating and called secure communication control systems, it is judged that both parties have the intention of effecting secure communication.

When the memory card 130 is set, step A59 is initiated, and the relay RY1 is turned on. In step A60, the value of the register (C1) is checked, and the procedure for an originating or called facsimile is taken as appropriate.

When the facsimile to which the secure communication control system in question belongs (i.e., local facsimile) is called, the status of switch (FAX-SW: SW1) is checked in step A69 to judge whether the facsimile is in the auto or manual mode. If the mode is manual, step A70 is initiated to turn on the relay RY2, thereby switching the facsimile side wires LF1, LF2 to the internal wires LiB of the secure communication control system. In step A71, a CED signal is sent to the far-end party, i.e., the originating facsimile. On the other hand, if the facsimile to which the secure communication control system in question belongs (i.e., local facsimile) is in the auto mode, the call handling procedure advances to step G51 in FIG. 12g. When the CED signal from the local facsimile is detected, the relay RY2 is turned on after a period of $T \times 2$, thereby switching LF1 and LF2 of the local facsimile to the internal wires LiB of the secure communication control system.

Then, the status of security switch (SW2) is checked. If SW2 is on, it is judged that the secure communication is requested, and thus ACTC is stored in the register (Mr). If SW2 is off, NACTC is stored in the register (Mr). Then, the procedure advances to step G61, and a state for receiving the DIS signal is established. Then, the procedure moves to step H51 in step 12h, and the data of the register (Mr) is forwarded to the far-end facsimile.

Figure 12B:
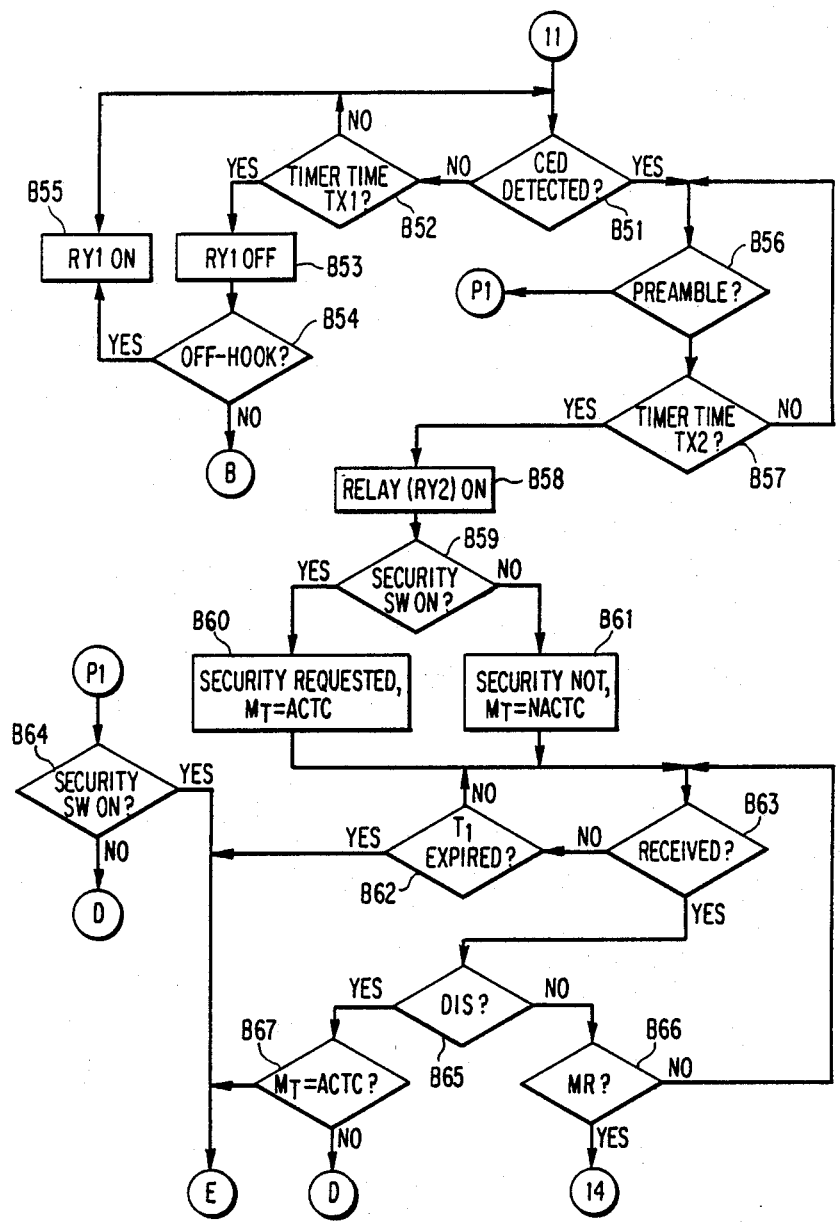
Figure 12C:
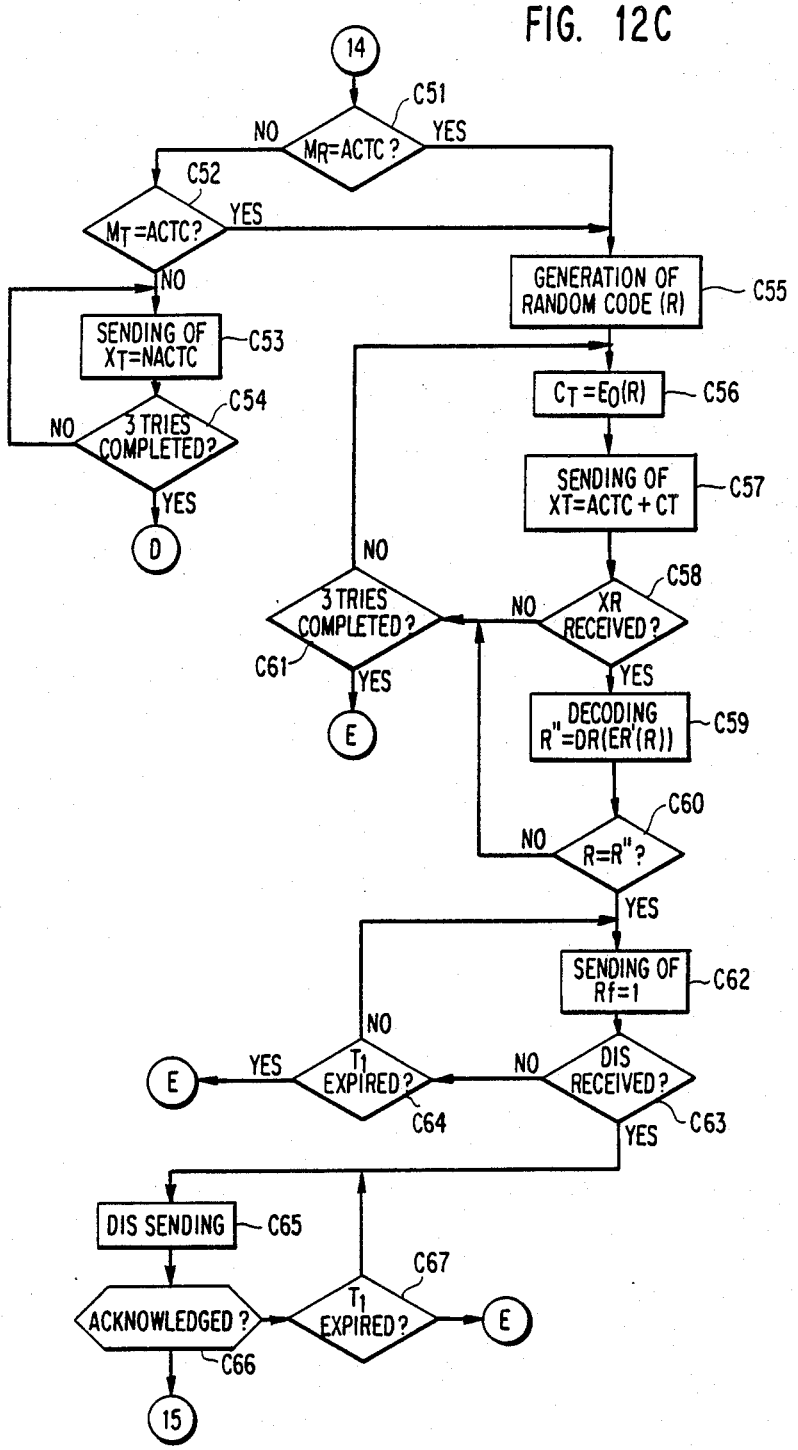
Figure 12D:
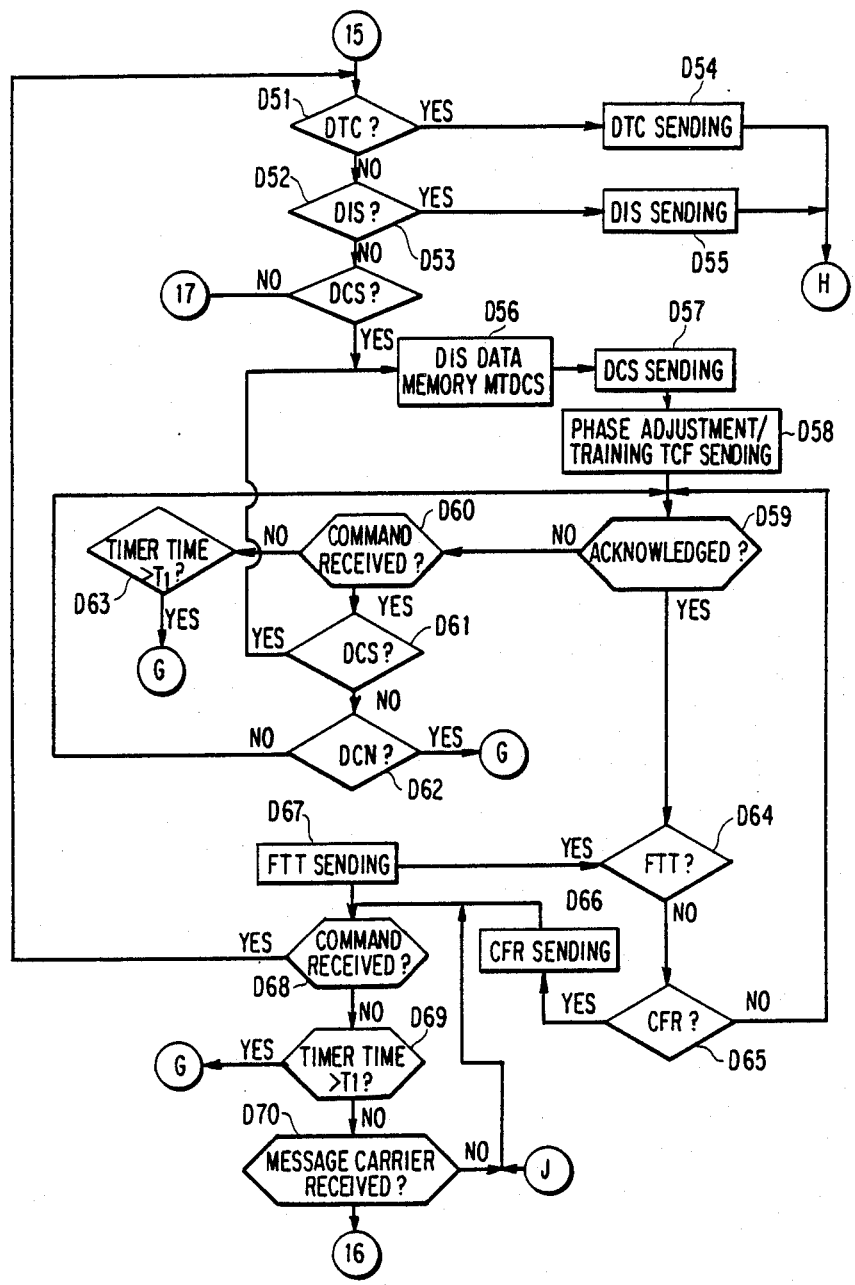
Figure 12E:
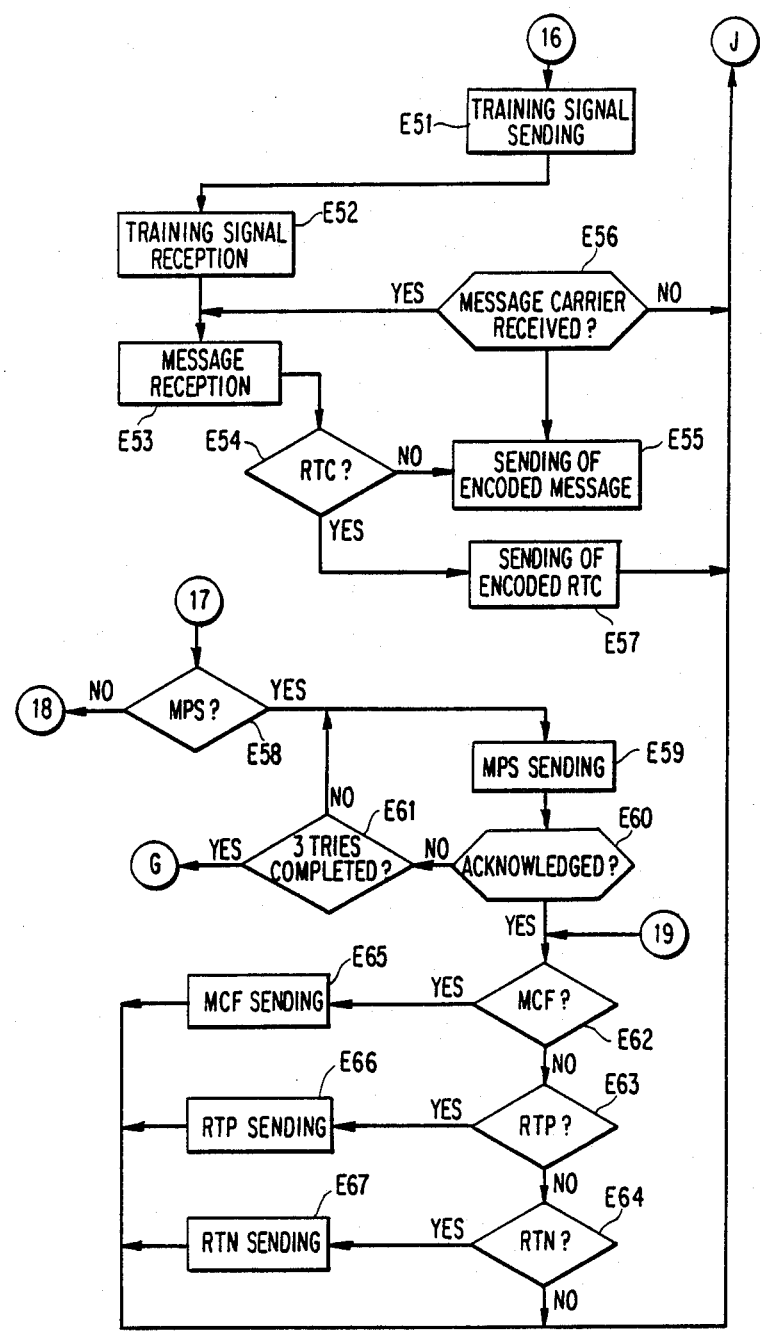
Figure 12F:
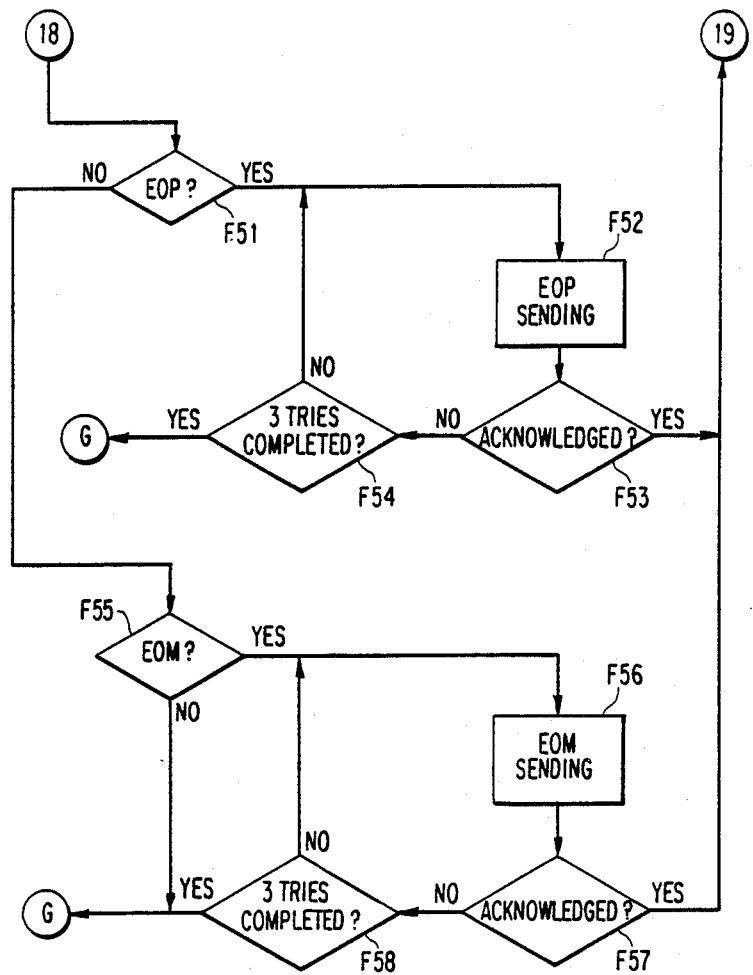
Figure 12G:
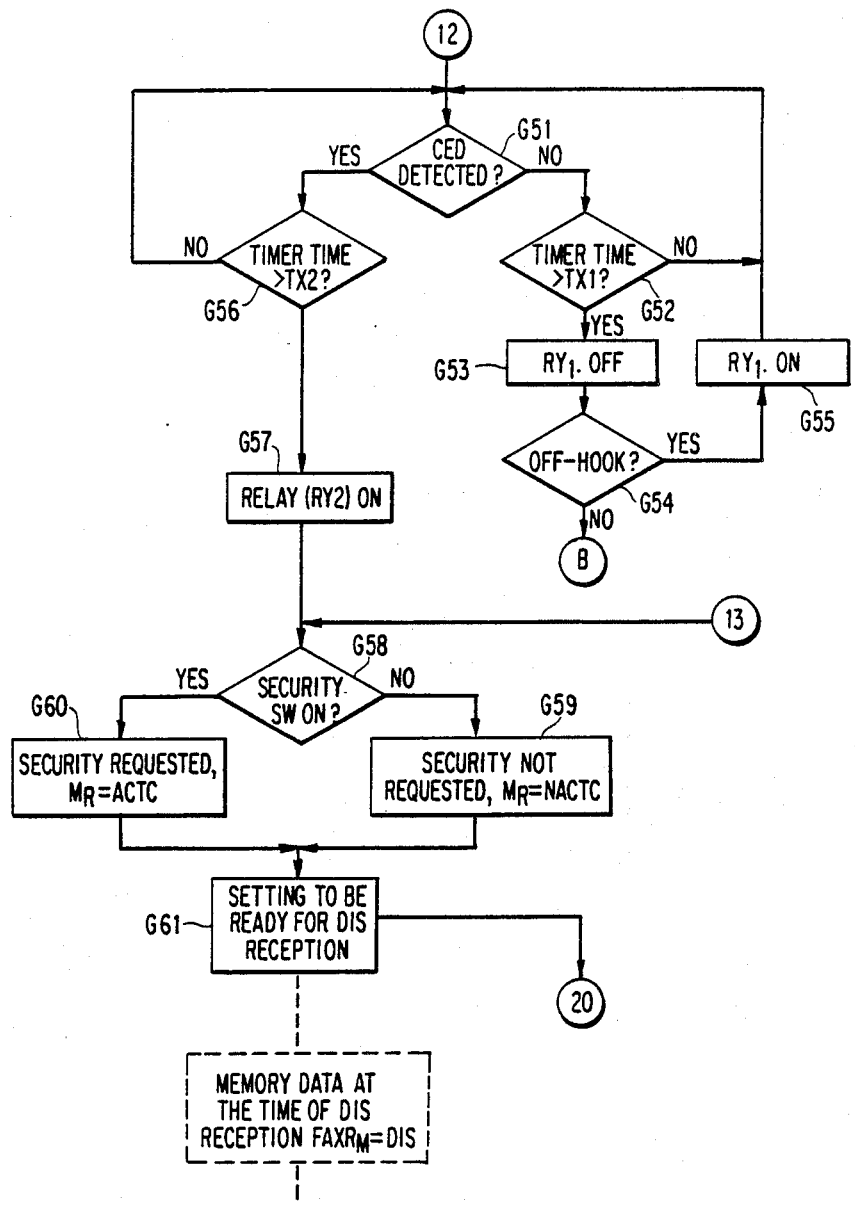

The following explanation refers to a case where the local facsimile is in the originating mode. In this case, step B51 in FIG. 12b is initiated, and the secure communication control system watches for presence of the CED signal. When the CED signal is detected, the process is advanced to step A56. If the called station is an ordinary facsimile, a preamble is sent. In case the secure communication control system of the called station is in operation, however, the data of the register (Mr) is sent in step H51 in FIG. 12h instead of the preamble following the CED signal. In this case, after an elapse of a specified time ($T \times 2$), the process moves from step B57 to step B58, thereby turning on the relay RY2 to switch the line connection.

In step B59, the status of the security switch SW2 is checked, and the register (Mt) is set according to the status of SW2. As the data of the register (Nr) is received, the process moves from step B66 to step C51 in FIG. 12c. If the data of the register (Mr) or (Mt) is ACTC (i.e., secure communication is requested), step C55 is initiated. In step C55, the level of the RDM signal generated by the random number generator is sampled repeatedly to produce a random code (R). In step C56, the random code (R) is given to the enciphering signal input terminal (X) of the encoder/decoder processing circuit 600, and at the same time the ID code obtained from the memory card 130 is supplied as a master key to the encoder/decoder processing circuit 600, and thus the key codes KA, KB corresponding to the master key are generated to produce data (Ct) into which the random code (R) is encoded. In step C56, data (Xt) produced by adding data Ct to code (ACTC) is sent to the called station.

Figure 12H:
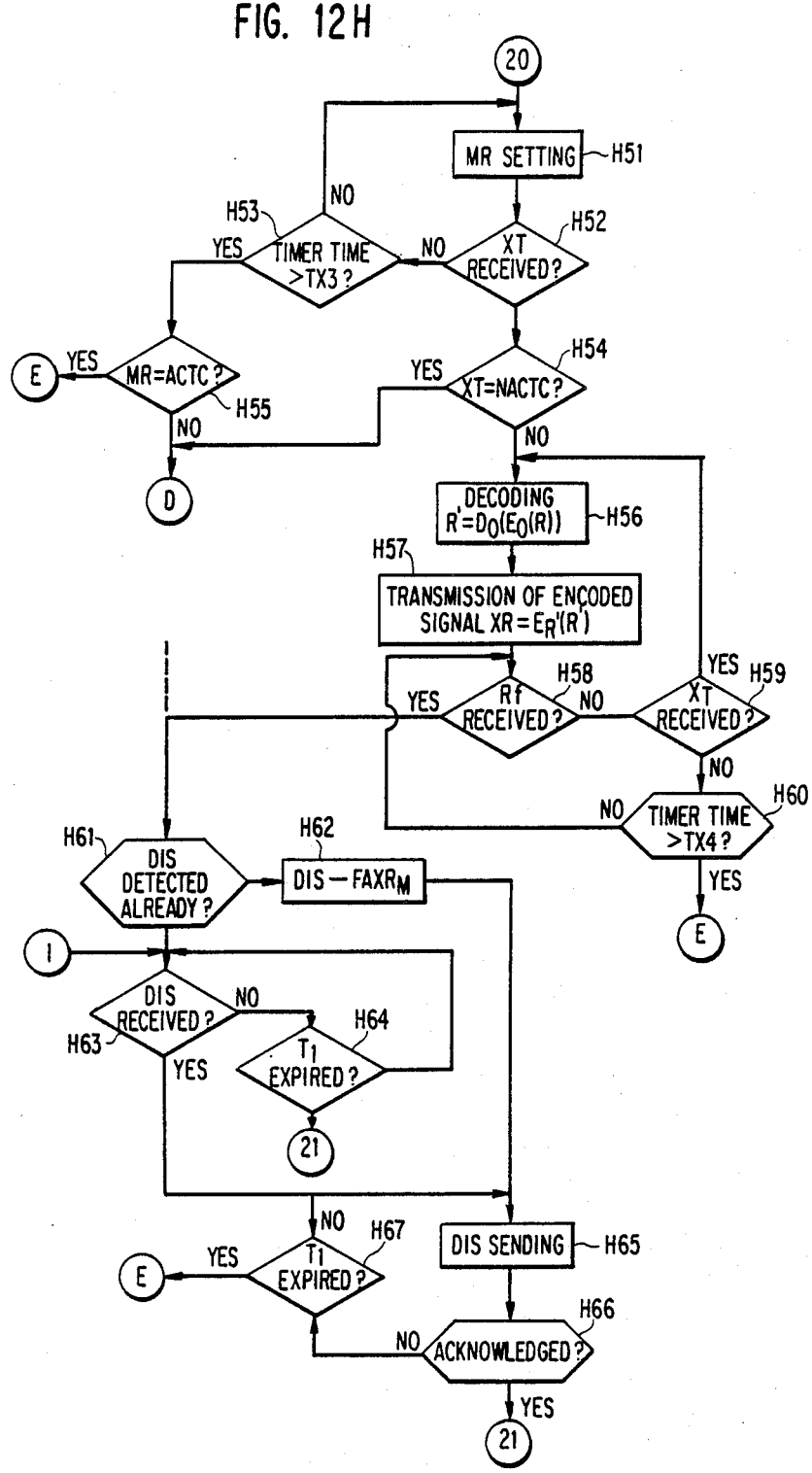
Figure 12:
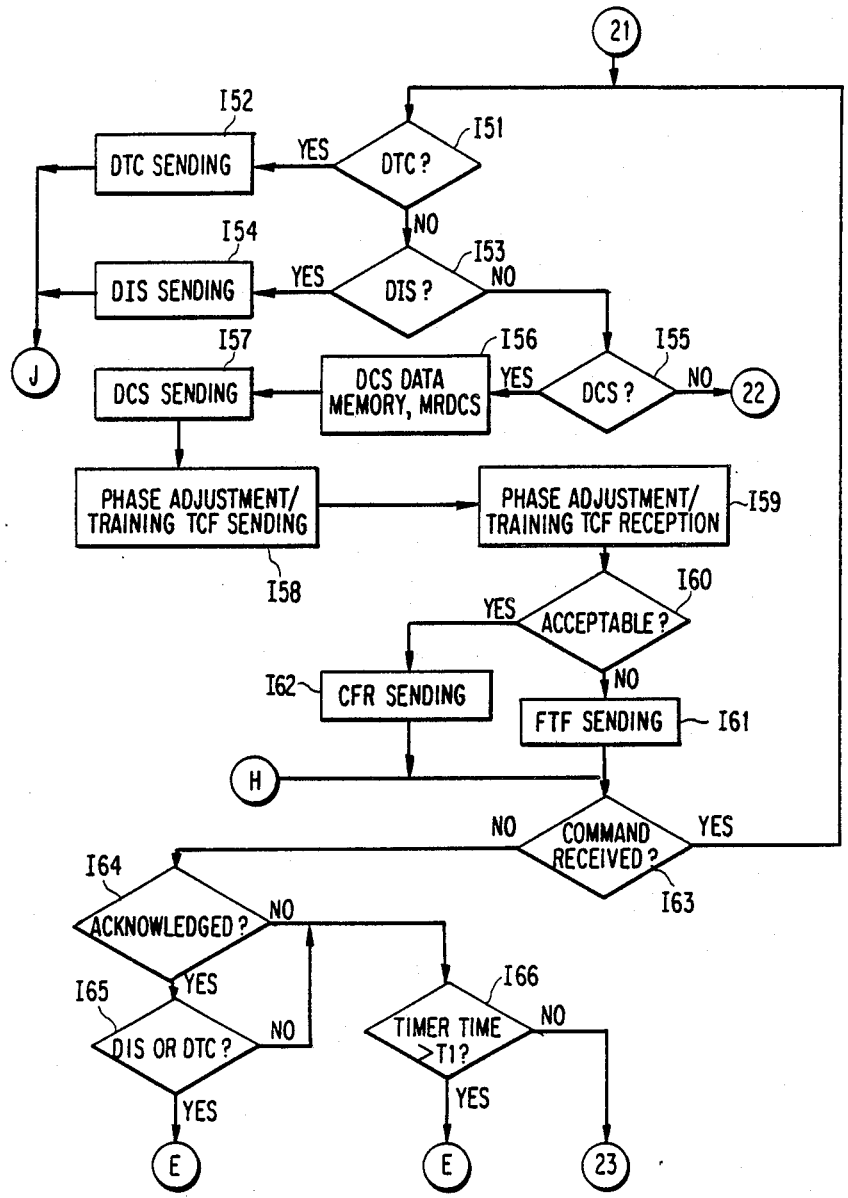
Figure 12J:
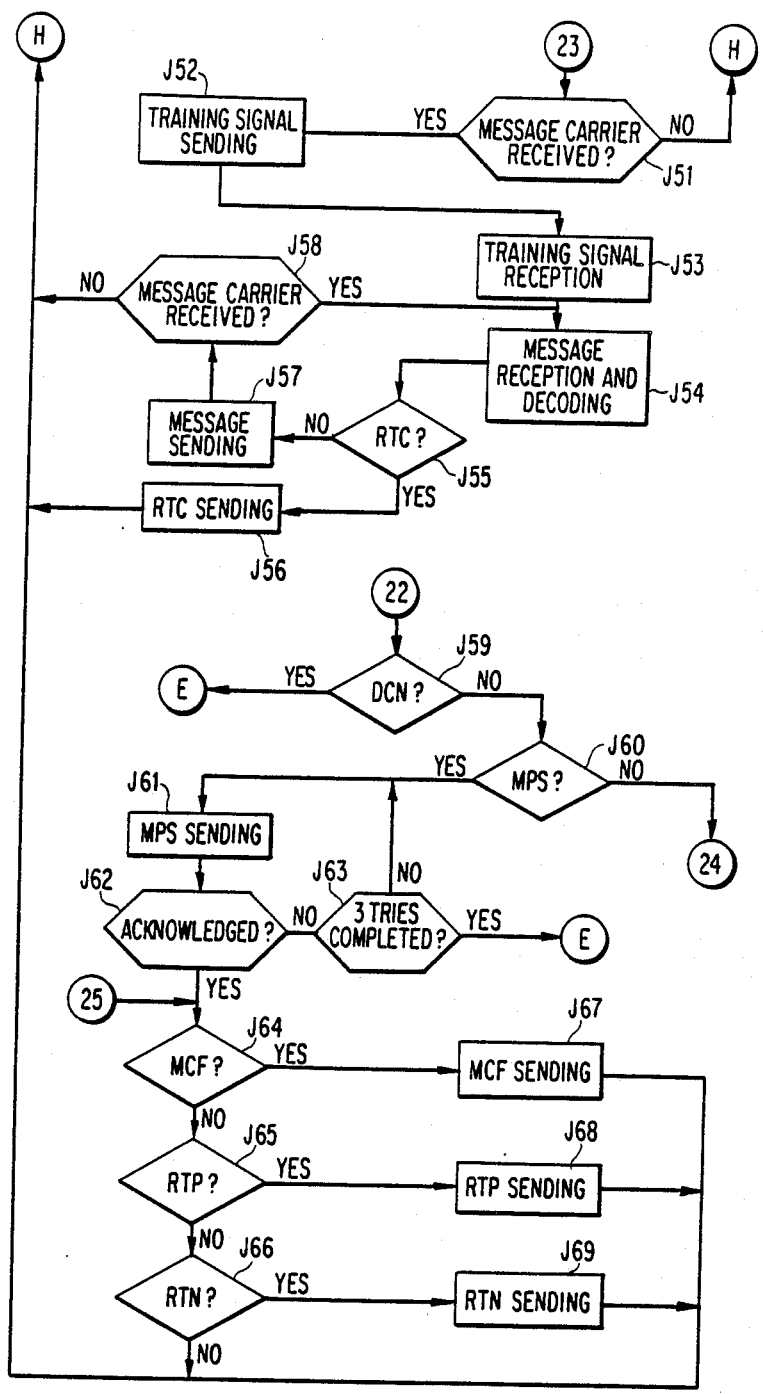

In step H52 in FIG. 12h, the called station receives data (Xt) sent from the originating station. If Xt is not NACTC, step H56 is initiated. In step H56, the ID code of the called station's memory card is given as a master key to the encoder/decoder processing circuit 600, thereby generating the key codes KA, KB corresponding to the master key.

The received enciphered signal is supplied to the deciphering signal input terminal (Y) of the encoder/decoder processing circuit 600 for deciphering. The deciphered signal (R') is delivered to the data bus.

In step H57, the deciphered signal (R') is supplied as a master key to the encoder/decoder processing circuit 600, thereby producing the key codes (KA, KB) corresponding to the master key. The deciphered signal (R') is supplied to the enciphering signal input terminal (X) of the encoder/decoder processing circuit 600, and is enciphered into signal (Xr). This enciphered signal (Xr) is sent to the originating station.

If the originating station receives enciphered signal (Xr) in step C58, step C59 is initiated, in which the enciphered signal (Xr) is supplied to the enciphering signal input terminal (Y) of the encoder/decoder processing circuit 600, and at the same time the same value of the random data sent earlier is supplied as a master key to the encoder/decoder processing circuit 600 for decoding the enciphered signal (Xr). The signal (R'') decoded in this way is expressed as follows.

$$R'' = Dr (Er'(R')) \tag{1}$$

where R''': R deciphered by the called station; Er': encoding function of the called station; and Dr: decoding function of the originating station.

If the encoding and decoding conditions are in agreement between the originating and called stations, R'40 becomes equal to the random code (R) sent earlier. In case the ID code of the memory card is different between the originating and called stations, R and R'' are not equal.

In step C60, the originating secure communication control system compares R and R'' with each other. If R and R'' are equal, step C62 is initiated, and 1 is stored into the register (Rf). The data of the register (Rf) is forwarded to the called station. If R and R'' are not equal, loop checking (i.e., comparison of transmitted signal and returned signal) is carried out three times. If no agreement is detected by the loop checking, the secure communication is aborted. When the called station receives the data of the register (Rf) in step H58 in FIG. 12h, the process advances to step H61.

Until secure communication is enabled as explained above, the called facsimile continues to send the DIS signal, and the originating facsimile continues to wait for the DIS signal.

When the secure communication control system of the called station progresses to step H65, it sends the originating station the DIS signal which has already been received from the local facsimile. When secure communication is set up in this way, the same procedure as for the ordinary facsimile communication is followed. During facsimile communication, the secure communication control system serves as an intermediary for data transmission between the local facsimile and the far-end station (far-end secure communication control system); the data transmitted from the local facsimile is sent to the far-end station via the local secure communication control system, and the data received from the far-end station is forwarded to the local facsimile via the local secure communication control system.

When the secure communication control system exchanges image data, it encodes or decodes it. In this process, the data to be encoded is supplied to the enciphering signal input terminal (X) of the encoder/decoder processing circuit 600, and the data to be decoded is supplied to the deciphering signal input terminal (Y). The random code exchanged and verified between the local and far-end stations is used as a master key code for the encoder/decoder processing circuits 600 of both the local and far-end secure communication control systems. That is, each different session uses a unique random code as a key to secure communication (session key), ensuring quite a high degree of security.

While the preferred embodiment uses arithmetic addition and exclusive OR for encoding and decoding, various other methods of enciphering and deciphering which are already known can also be used successfully for the present invention. For example, the key value may be incremented for sequential renewal as in the stream encryption technique, or the data enciphered immediately before may be used as a key.

While the preferred embodiment of the present invention has been detailed with reference to the secure communication between facsimiles, the secure communication control system according to the present invention can also be used for secure communication between any devices following the same communication procedure as explained above.

The inventive secure communication control system makes it possible to add a secure communication function to almost every conventional terminal equipment without any modification to that equipment. What is required is installation of the secure communication control system in series to the communication line of the terminal equipment. The inventive secure communication control system can be used as a compact attachment, and can be carried conveniently with the operator who wants to transmit and receive classified information and data by making use of whatever terminal may come in handy.

We claim:

1. In a communication system comprising a local device and a far-end device which communicate with each other, a secure communication control system comprising:
   a first plurality of signal wires connected to the far-end device;
   a first modem, having modulation input terminals and connected to said first plurality of signal wires, for demodulating a signal coming over said first plurality of signal wires, and for modulating a signal supplied to its modulator input terminals and delivering the modulated signal to said first plurality of signal wires;
   a second plurality of signal wires connected to said local device;
   a third plurality of signal wires;
   a second modem, having modulator input terminals and connected to said third plurality of signal wires, for demodulating a signal coming over said third plurality of signal wires and for modulating a signal supplied to its modulator input terminals and delivering the modulated signal to said third plurality of signal wires;
   secure information processing means for decoding the signal demodulated by said first modem and supplying the decoded signal to the modulator input terminals of said second modem, and for encoding the signal demodulated by said second modem and supplying the encoded signal to the modulator input terminals of said first modem;
   switching means for selectively connecting said second plurality of signal wires to one of said first plurality of signal wires or said third plurality of signal wires; and
   electronic control means for controlling said switching means, said first modem and said second modem to intervene between said local and said far-end devices, for channelling encoded incoming information over said first plurality of signal wires to said secure information processing means which in turn decodes and delivers decoded outgoing information to said second plurality of signal wires, and for channelling information transmitted from said second plurality of signal wires through said secure information processing means to encode and deliver encoded outgoing information to said first set of signal wires.

2. A secure communication control system as set forth in claim 1, wherein said electronic control means includes;
   detachably fitted identification code holding means for holding an identification code; and
   random number generating means for generating and transmitting a master key code corresponding to the identification code generated by said identification code holding means and an enciphered signal corresponding to a random number generated by said random number generating means to the far-end device and a looped-back signal to the local device, such that if the decoded signal of the looped-back signal is in agreement with the transmitted random number, said random number is used as a key code for encoding and decoding successive secure communications.

3. A secure communication control system according to claim 2, wherein said random number generating means includes a comparator circuit for comparing a level of a ripple signal available by rectifying and smoothing an AC power signal with a fixed reference signal.

4. A secure communication control system according to claim 1, wherein said electronic control means includes:
   hook signal detecting means, connected to said first set of signal wires, for checking a level of current through said first set of signal wires to detect whether the local device is on hook or off hook; and
   ringing detection means, connected to said first set of signal wires, for detecting a ringing signal applied to said first set of signal wires and judging which of the off-hook signal and ringing signal is detected first so as to determine automatically whether the local device is originating or receiving a communication, whereby said secure information processing means is switched to one of an encoding mode or decoding mode accordingly.

5. A secure communication control system according to claim 1, wherein said electronic control means includes:
   polarity identification means, connected to said first set of signal wires, for identifying a direction of current flowing through said first set of signal wires; and
   current feed means for supplying to said third set of signal wires a current having the same polarity as that detected by the polarity identification means.

* * * * *